United States Patent
Han et al.

(10) Patent No.: US 11,380,326 B2
(45) Date of Patent: Jul. 5, 2022

(54) METHOD AND APPARATUS FOR PERFORMING SPEECH RECOGNITION WITH WAKE ON VOICE (WOV)

(71) Applicant: SAMSUNG ELECTRONICS CO., LTD., Suwon-si (KR)

(72) Inventors: Changwoo Han, Suwon-si (KR); Minkyu Shin, Suwon-si (KR); Jonguk Yoo, Suwon-si (KR); Dokyun Lee, Suwon-si (KR); Kangseok Choi, Suwon-si (KR); Jaewon Lee, Suwon-si (KR); Hyeontaek Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 43 days.

(21) Appl. No.: 16/875,236

(22) Filed: May 15, 2020

(65) Prior Publication Data

US 2020/0365152 A1 Nov. 19, 2020

(30) Foreign Application Priority Data

May 16, 2019 (KR) ........................ 10-2019-0058983

(51) Int. Cl.
*G10L 15/00* (2013.01)
*G10L 15/22* (2006.01)
(Continued)

(52) U.S. Cl.
CPC .............. *G10L 15/22* (2013.01); *G10L 15/02* (2013.01); *G10L 15/16* (2013.01); *G10L 19/008* (2013.01);
(Continued)

(58) Field of Classification Search
CPC combination set(s) only.
See application file for complete search history.

(56) References Cited

U.S. PATENT DOCUMENTS

| 2003/0177007 A1 | 9/2003 | Kanazawa et al. |
| 2016/0150315 A1 | 5/2016 | Tzirkel-Hancock et al. |

(Continued)

FOREIGN PATENT DOCUMENTS

KR 1020180023702 A 3/2018

OTHER PUBLICATIONS

Huang, Yiteng (Arden) et al., "Hotword Cleaner: Dual-Microphone Adaptive Noise Cancellation With Deferred Filter Coefficients for Robust Keyword Spotting", Proc. ICASSP, IEEE, 2019, pp. 6346-6350. (6 pages total).

(Continued)

*Primary Examiner* — Vu B Hang
(74) *Attorney, Agent, or Firm* — Sughrue Mion, PLLC

(57) ABSTRACT

A speech recognition method includes receiving a first multi-channel audio signal; obtaining at least one of a speech signal characteristic or a noise signal characteristic for at least one frequency band of frequency bands corresponding to channel audio signals included in the first multi-channel audio signal; generating a signal with an enhanced speech component by performing beamforming on the first multi-channel audio signal based on the speech signal characteristic, a speech signal characteristic obtained for a previous frame that was obtained before a certain time that the first multi-channel audio signal was obtained, and the noise signal characteristic; determining whether the enhanced speech component includes a wake word; and based on determining that the enhanced speech component includes the wake word: activating a speech recognition operation based on the signal with the enhanced speech component.

18 Claims, 12 Drawing Sheets

(51) Int. Cl.
  *G10L 15/02* (2006.01)
  *G10L 19/008* (2013.01)
  *G10L 15/16* (2006.01)
  *G10L 15/08* (2006.01)
  *G10L 21/0208* (2013.01)

(52) U.S. Cl.
  CPC .......... *G10L 15/08* (2013.01); *G10L 21/0208* (2013.01); *G10L 2015/088* (2013.01)

(56) References Cited

U.S. PATENT DOCUMENTS

| | | | |
|---|---|---|---|
| 2017/0076720 A1 | 3/2017 | Gopalan et al. | |
| 2017/0365274 A1 | 12/2017 | Maziewski et al. | |
| 2018/0075867 A1 | 3/2018 | Dahl et al. | |
| 2018/0197534 A1 | 7/2018 | Li et al. | |
| 2018/0268808 A1 | 9/2018 | Song | |
| 2018/0336906 A1 | 11/2018 | Rubin et al. | |
| 2019/0172450 A1* | 6/2019 | Mustiere | G10L 15/20 |
| 2019/0221210 A1 | 7/2019 | Song | |
| 2019/0355384 A1* | 11/2019 | Sereshki | G10L 15/22 |

OTHER PUBLICATIONS

Fischman, Rajmil, "The phase vocoder: theory and practice", Tutorial Article, Organised Sound, vol. 2, No. 2, 1997, pp. 127-145. (19 pages total).

Han et al., "Dual Front-End for Speech Interference Robust Wake on Voice," Samsung Best Paper Award 2019, six pages.

Communication dated Jan. 24, 2022 by the European Patent Office in counterpart European Patent Application No. 20806037.6.

Communication dated Apr. 4, 2022 by the European Patent Office in counterpart European Patent Application No. 20806037.6.

Kida, Yusuke et al., "Speaker Selective Beamformer With Keyword Mask Estimation", 2018 IEEE Spoken Language Technology Workshop (SLT), IEEE, Dec. 18, 2018, pp. 528-534, XP033517051. (7 pages total).

Araki, Shoko et al., "Online Meeting Recognition in Noisy Environments With Time-Frequency Mask Based MVDR Beamforming", 2017 Hands-Free Speech Communications and Microphone Arrays (HSCMA), IEEE, Mar. 1, 2017, pp. 16-20, XP033084991. (5 pages total).

Boeddeker, Christopher et al., "Exploring Practical Aspects of Neural Mask-Based Beamforming for Far-Field Speech Recognition", 2018 IEEE in International Conference on Acoustics, Speech and Signal Processing (ICASSP), IEEE, Apr. 15, 2018, pp. 6697-6701, XP033400947. (5 pages total).

Araki, Shoko et al., "Meeting Recognition With Asynchronous Distributed Microphone Array Using Block-Wise Refinement of Mask-Based MVDR Beamformer", 2018 IEEE International Conference on Acoustics, Speech and Signal Processing (ICASSP), IEEE, Apr. 15, 2018, pp. 5694-5698, XP033401769. (5 pages total).

Heymann, John et al., "Beamnet: End-To-End Training of a Beamformer-Supported Multichannel ASR System", 2017 IEEE International Conference on Acoustics, Speech and Signal Processing (ICASSP), IEEE, Mar. 5, 2017, pp. 5325-5329, XP033259427. (5 pages total).

Malek, Jiri et al., "Block-Online Multi-Channel Speech Enhancement Using DNN-Supported Relative Transfer Function Estimates", arxiv.org, Cornell University Library, 201 Olin Library Cornell University, Ithaca, NY, 14853, May 9, 2019, arXiv:1905.03632v3, [cs.SD], Dec. 11, 2019, XP081549153. (10 pages total).

Heymann, John et al., "BLSTM Supported Gev Beamformer Front-End for the 3rd Chime Challenge", 2015 IEEE Workshop on Automatic Speech Recognition and Understanding (ASRU), IEEE, Dec. 13, 2015, pp. 444-451, XP032863580. (8 pages total).

* cited by examiner

METHOD AND APPARATUS FOR PERFORMING SPEECH RECOGNITION WITH WAKE ON VOICE (WOV)

CROSS-REFERENCE TO RELATED APPLICATION

This application is based on and claims priority under 35 U.S.C. § 119 to Korean Patent Application No. 10-2019-0058983, filed on May 16, 2019, in the Korean Intellectual Property Office, the disclosure of which is incorporated by reference herein in its entirety.

BACKGROUND

1. Field

The disclosure relates to a method and apparatus for performing speech recognition, and more particularly, to a speech recognition operation method and apparatus for performing front-end processing for wake word activation (e.g., speech-interference robust wake on voice (WoV)).

2. Description of Related Art

As electronic apparatuses that perform various functions in combination have been developed, electronic apparatuses equipped with a speech recognition function have been released to improve operability. The speech recognition function may easily control an apparatus by recognizing speech of a user in a hands-free manner (e.g., without a separate button operation or contact of a touch module).

According to the speech recognition function, for example, a portable terminal such as a smart phone and a home appliance such as a television (TV), a refrigerator, etc. may perform a call function or write a text message without pressing of a separate button, and may easily set various functions, such as, navigation directions, Internet searching, setting of an alarm, etc.

In order to be controlled by the speech of a user located at a significant distance away from a speech recognition apparatus, the speech recognition apparatus must be able to ensure stable performance even in a noisy environment. To ensure stable performance, a wake on voice (WoV) technology in which the user notifies the speech recognition apparatus of when to start a speech recognition operation may be used. To wake up the speech recognition apparatus, the user may utter a wake word (e.g., a word previously added that is to be determined before a main instruction word(s)). WoV technology is the first step in speech control, and thus high accuracy is desired.

Meanwhile, an artificial intelligence (AI) system is a computer system with human level intelligence. Unlike an existing rule-based smart system, the AI system is a system that may train itself autonomously, makes decisions, and becomes increasingly smarter. The more an AI system is used, the more the recognition rate of the AI system may improve and the AI system may more accurately understand a user preference, and thus, existing rule-based smart systems are gradually being replaced by deep-learning-based AI systems.

AI technology refers to machine learning (deep learning) and element technologies that utilize machine learning.

Machine learning is an algorithm technology that classifies/learns the features of input data autonomously. Element technology is a technology that utilizes a machine learning algorithm such as deep learning and consists of technical fields such as linguistic understanding, visual comprehension, reasoning/prediction, knowledge representation, and motion control.

AI technology is applied to various fields as follows. Linguistic understanding is a technology for identifying and applying/processing human language/characters and includes natural language processing, machine translation, dialogue systems, query response, speech recognition/synthesis, and the like. Reasoning prediction is a technology for acquiring and logically inferring and predicting information and includes knowledge/probability based reasoning, optimization prediction, preference based planning, recommendation, and the like. Knowledge representation is a technology for automatic processing of human experience information into knowledge data and includes knowledge building (data generation/classification), knowledge management (data utilization), and the like.

SUMMARY

When a speech recognition apparatus operates in an environment in which noise including a speech is present, such as a TV viewing environment, there is a problem in that a wake up success rate of the speech recognition apparatus significantly deteriorates because the existing front-end processing technique does not operate properly (or no front-end processing is even performed).

Additional aspects will be set forth in part in the description which follows and, in part, will be apparent from the description, or may be learned by practice of the presented embodiments of the disclosure.

According to an embodiment of the disclosure, a speech recognition method includes receiving a first multi-channel audio signal; obtaining a speech signal characteristic and a noise signal characteristic for each frequency band from each channel audio signal included in the first multi-channel audio signal; generating a signal with an enhanced speech component by performing beamforming on the first multi-channel audio signal based on the speech signal characteristic, a speech signal characteristic obtained before a certain time, and the noise signal characteristic; activating a speech recognition operation based on the signal with the enhanced speech component; and performing speech recognition on a second multi-channel audio signal and outputting a speech recognition result.

According to another embodiment of the disclosure, a speech recognition apparatus includes a receiver configured to receive a first multi-channel audio signal; at least one processor configured to obtain a speech signal characteristic and a noise signal characteristic for each frequency band from each channel audio signal included in the first multi-channel audio signal, generate a signal with an enhanced speech component by performing beamforming on the first multi-channel audio signal based on the speech signal characteristic, a speech signal characteristic obtained before a certain time, and the noise signal characteristic, activate a speech recognition operation based on the signal with the enhanced speech component, and perform speech recognition on a second multi-channel audio signal; and an output interface configured to output a speech recognition result.

According to another embodiment of the disclosure, provided is a computer readable recording medium having stored therein a program for performing a speech recognition method including receiving a first multi-channel audio signal; obtaining a speech signal characteristic and a noise signal characteristic for each frequency band from each channel audio signal included in the first multi-channel audio signal; generating a signal with an enhanced speech component by performing beamforming on the first multi-channel audio signal based on the speech signal characteristic, a speech signal characteristic obtained before a certain time, and the noise signal characteristic; activating a speech recognition operation based on the signal with the enhanced speech component; and performing speech recognition on a second multi-channel audio signal and outputting a speech recognition result.

According to an embodiment, provided is speech recognition method comprising: receiving a first multi-channel audio signal; obtaining at least one of a speech signal characteristic or a noise signal characteristic for at least one frequency band of frequency bands corresponding to channel audio signals included in the first multi-channel audio signal; generating a signal with an enhanced speech component by performing beamforming on the first multi-channel audio signal based on the speech signal characteristic, a speech signal characteristic obtained for a first frame that was obtained within a certain time period prior to a time that a second frame was obtained, and the noise signal characteristic determining whether the enhanced speech component includes a wake word; and based on determining that the enhanced speech component includes the wake word: determining to wake up; and activating a speech recognition operation based on the signal with the enhanced speech component.

According to an embodiment, the performing of the beamforming may include removing an estimated noise attribute of speech prior to current speech from the current speech.

According to an embodiment, the speech recognition method may further comprise: based on receiving a second multi-channel audio signal after the speech recognition operation has been activated, performing speech recognition on the second multi-channel audio signal.

According to an embodiment, the speech recognition method may further comprise: outputting a speech recognition result or performing a certain operation corresponding to the speech recognition result.

According to an embodiment, the generating of the signal with the enhanced speech component may comprise: generating a first enhancement signal by performing first beamforming on the first multi-channel audio signal based on the speech signal characteristic and the noise signal characteristic; and generating a second enhancement signal by performing second beamforming on the first multi-channel audio signal based on the speech signal characteristic and a speech signal characteristic obtained prior to an M frame.

According to an embodiment, the activating of the speech recognition operation may comprises: activating the speech recognition operation based on a determination that the wake word is included in the first enhancement signal or the second enhancement signal.

According to an embodiment, the second multi-channel audio signal may comprise a speech signal uttered after a user utters the wake word.

The second enhancement signal may be a signal obtained by removing the speech signal characteristic obtained prior to the M frame from the speech signal characteristic.

According to an embodiment, the obtaining of the speech signal characteristic and the noise signal characteristic may comprise: obtaining frequency bin values by performing frequency conversion on the each channel audio signal; and obtaining speech cross power spectral density (PSD) and noise cross-PSD for each frequency band from each of the obtained frequency bin values by applying a mask.

The first multi-channel audio signal may comprise M audio signals received through M channels, the speech cross-PSD and the noise cross-PSD are in the form of an M×M matrix.

According to an embodiment, the speech recognition method estimate a mask used to obtain the speech signal characteristic and the noise signal characteristic, wherein the estimating of the mask comprises: converting the first multi-channel audio signal into a single-channel audio signal by applying a median value filter to the first multi-channel audio signal; and estimating a mask value for each frequency band through a neural network analysis of the single-channel audio signal.

The performing of speech recognition and the outputting of the speech recognition result may comprises: based on the speech recognition operation being activated based on a determination that the wake word is included in the first enhancement signal, performing adaptive beamforming on the second multi-channel audio signal; and based on the speech recognition operation being activated based on a determination that the wake word is not included in the first enhancement signal but the wake word is included in the second enhancement signal, performing fixed beamforming on the second multi-channel audio signal.

According to an embodiment, the speech recognition method may further include performing of the adaptive beamforming comprising performing beamforming based on updated parameters by updating parameters every frame of the second multi-channel audio signal, and wherein the performing of the fixed beamforming comprises performing beamforming on the second multi-channel audio signal based on parameters used in generating the second enhancement signal.

The first multi-channel audio signal and a second multi-channel audio signal may be received from a plurality of microphones included in a speech recognition apparatus.

According to an embodiment, a speech recognition apparatus may comprise: a receiver configured to receive a first multi-channel audio signal; at least one processor configured to: receive a first multi-channel audio signal; obtain at least one of a speech signal characteristic or a noise signal characteristic for at least one frequency band of frequency bands corresponding to channel audio signals included in the first multi-channel audio signal; generate a signal with an enhanced speech component by performing beamforming on the first multi-channel audio signal based on the speech signal characteristic, a speech signal characteristic obtained for a first frame that was obtained within a certain time period prior to a time that a second frame was obtained, and the noise signal characteristic; determine whether the enhanced speech component includes a wake word; and based on determining that the enhanced speech component includes the wake word: determine to wake up; and activate a speech recognition operation based on the signal with the enhanced speech component.

The processor may be further configured to perform the beamforming by removing an estimated noise attribute of speech prior to current speech from the current speech.

The receiver may comprise a plurality of microphones.

The first multi-channel audio signal and the second multi-channel audio signal may be received from the plurality of microphones.

According to an embodiment, a non-transitory computer readable recording medium having stored therein computer program code that, when executed, causes to execute the following method: receiving a first multi-channel audio signal; obtaining at least one of a speech signal characteristic or a noise signal characteristic for at least one frequency band of frequency bands corresponding to channel audio signals included in the first multi-channel audio signal; generating a signal with an enhanced speech component by performing beamforming on the first multi-channel audio signal based on the speech signal characteristic, a speech signal characteristic obtained for a first frame that was obtained within a certain time period prior to a time that a second frame was obtained, and the noise signal characteristic determining whether the enhanced speech component includes a wake word; and based on determining that the enhanced speech component includes the wake word: determining to wake up; and activating a speech recognition operation based on the signal with the enhanced speech component.

According to an embodiment, a front-end processing method for an electronic digital voice assistant device may comprise: generating a speech enhancement signal by performing beamforming on a multi-channel audio signal; and determining whether to wake up based on the speech enhancement signal, wherein the performing of the beamforming includes removing an estimated noise attribute of speech prior to current speech from the current speech.

According to an embodiment, the performing of the beamforming includes using an Eigenvalue (GEV) beamformer that obtains filter coefficients used to constitute a filter that maximizes a signal noise ratio (SNR) for each of time-frequency bin values obtained by frequency converting the multi-channel audio signal.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
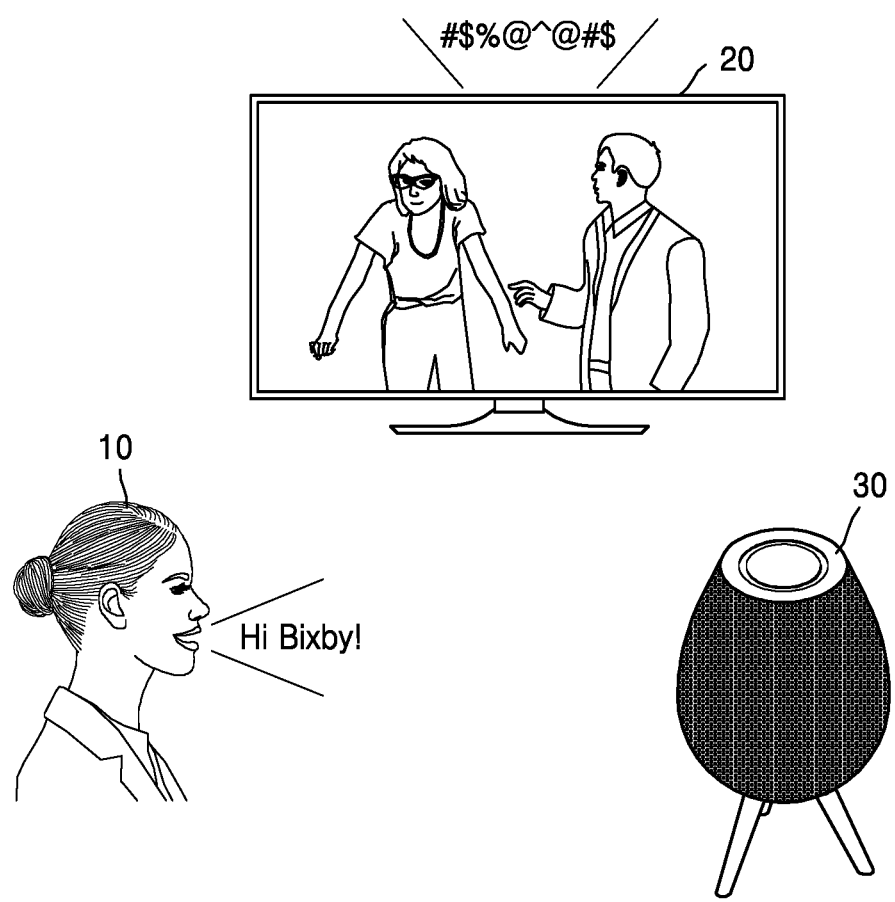
FIG. 1 is a diagram for illustrating a problem in which a wake-up success rate of a speech recognition operation deteriorates in an environment in which speech interference is present.

Hereinafter, embodiments of the disclosure will be described in detail with reference to the accompanying drawings so that those of ordinary skill in the art can easily carry out the disclosure. However, the disclosure may be embodied in many different forms and is not limited to the embodiments of the disclosure described herein. In order to clearly describe the disclosure, portions that are not relevant to the description of the disclosure are omitted, and like reference numerals in the drawings denote like elements.

Throughout the disclosure, the expression "at least one of a, b or c" indicates only a, only b, only c, both a and b, both a and c, both b and c, all of a, b, and c, or variations thereof.

It will be understood that when region is referred to as being "connected to" another region, the region may be directly connected to the other region or electrically connected thereto with an intervening region therebetween. It will be further understood that the terms "comprises" and/or "comprising" used herein specify the presence of stated features or components, but do not preclude the presence or addition of one or more other features or components.

The expression "according to an embodiment" used in the entire disclosure does not necessarily indicate the same embodiment of the disclosure.

The aforementioned embodiments of the disclosure may be described in terms of functional block components and various processing steps. Some or all of such functional blocks may be realized by any number of hardware and/or software components configured to perform the specified functions. For example, functional blocks according to the disclosure may be realized by one or more microprocessors or by circuit components for a certain function. In addition, for example, functional blocks according to the disclosure may be implemented with any programming or scripting language. The functional blocks may be implemented in algorithms that are executed on one or more processors. Furthermore, the disclosure described herein could employ any number of techniques according to the related art for electronics configuration, signal processing and/or control, data processing and the like. The words "module" and "configuration" are used broadly and are not limited to mechanical or physical embodiments of the disclosure.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Hereinafter, the disclosure will be described in detail with reference to the attached drawings.

A speech recognition interface has recently become a representative element for controlling a smart device. In order to be controlled by the speech of a user located at a distance quite far away from a speech recognition apparatus, the speech recognition apparatus must be able to ensure a stable performance even in a noisy environment. To ensure the stable performance, a wake on voice (WoV) technology in which the user notifies the speech recognition apparatus when to start a speech recognition operation may be used. To wake up the speech recognition apparatus, the user utters a wake word (wake-up keyword). The wake-up keyword may be added to a memory storing one or more wake-up keywords. The wake-up keyword may be recognized before the processor accepts an instruction (e.g., a main instruction). The WoV technology may be a first step of the speech control, and thus a high accuracy may be required.

The quality of a speech signal uttered by the user located at a distance far away from the speech recognition apparatus may seriously deteriorate due to noise and reverberation while the speech signal is transferred to the speech recognition apparatus. According to an embodiment, as illustrated in FIG. 1, when a speech recognition apparatus 30 operates in an environment in which noise including a speech is output from a noise producing device (e.g., TV 20), there is a problem in that a success rate of waking up the speech recognition apparatus 30 significantly deteriorates by a wake word of a user 10. According to an embodiment, the user may be located far away from the speech recognition apparatus 30. According to an embodiment, far away may include, for example, on another side of a room, and/or at a position such that a noise producing device or object (e.g., TV 20) is closer to the speech recognition apparatus 30 than the far away user 10.

To increase the accuracy of speech recognition in an environment in which a speech noise is present (e.g., an environment in which a song with lyrics is output or an environment in which many people are gathered, and/or an environment in which a speech noise is output from a TV), a multi-channel speech enhancement method according to an embodiment of the disclosure may be used.

According to a general multi-channel speech enhancement method, in the environment in which the speech noise is present, it is difficult to separately process an audio signal including a target speech signal and an audio signal including the speech noise from among audio signals received through a multi-channel. However, according to an embodiment of the disclosure, an audio signal including a wake word is determined from among audio signals received through the multi-channel and transferred to a wake-up module, thereby improving the speech recognition performance for wake-up.

According to an embodiment of the disclosure, beamforming is performed on a multi-channel audio signal, and thus a signal with an enhanced target speech component is transferred to the wake-up module, such that the speech recognition performance for wake-up may be improved. According to an embodiment of the disclosure, a front-end processing method of enabling speech-interference environment robust wake word detection is provided.

Figure 2A:
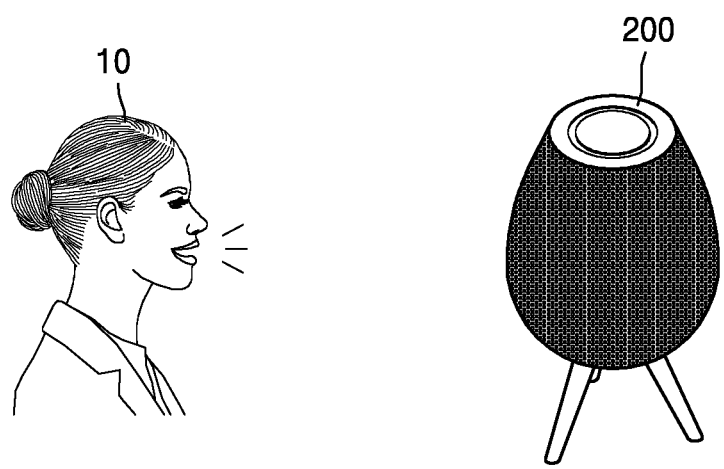
FIG. 2A is a diagram for describing a speech recognition system according to an embodiment of the disclosure.

FIG. 2A is a diagram for describing a speech recognition system according to an embodiment of the disclosure.

As shown in FIG. 2A, the speech recognition system according to an embodiment of the disclosure may include a speech recognition apparatus 200.

For example, as shown in FIG. 2A, the speech recognition apparatus 200 may be a digital voice assistant device based on artificial intelligence technology. However, the embodiment of the disclosure is not limited to the example shown in FIG. 2A. The speech recognition apparatus 200 may be a home appliance such as a TV, a refrigerator, a washing machine, etc., a smartphone, a personal computer (PC), a wearable device, a personal digital assistant (PDA), a media player, a micro server, or a global positioning system (GPS) apparatus, an e-book terminal, a digital broadcasting terminal, a navigation device, a kiosk, an Moving Picture Experts Group (MPEG)-1 Audio Layer III (MP3) player, a digital camera, or another mobile or non-mobile computing apparatus, but is not limited thereto.

The speech recognition apparatus 200, according to an embodiment of the disclosure, may include a plurality of microphones for receiving audio signals received in various directions. For example, when the speech recognition apparatus 200 is spherical or cylindrical, the speech recognition apparatus 200 may include the plurality of microphones arranged on the surface of the speech recognition apparatus 200 (e.g., arranged on the surface of the speech recognition apparatus 200 at regular intervals). For example, according to an embodiment, the speech recognition apparatus 200 may include eight microphones arranged at a 45 degree interval on the side surface of the speech recognition apparatus 200, thereby receiving eight channel audio signals received from all directions in 360 degrees. However, the embodiment of the disclosure is not limited thereto. The speech recognition apparatus 200 may receive audio signals through various numbers of channels, such as, for example, 2 channels, 4 channels, 6 channels, or 8 channels. However, the embodiment of the disclosure is not limited thereto.

The speech recognition apparatus 200, according to an embodiment of the disclosure, may perform front-end processing on the received audio signal in order to increase the accuracy of speech recognition. For example, the speech recognition apparatus 200 may perform beamforming on a received multi-channel audio signal to generate a signal with an enhanced target speech signal and perform speech recognition based on the enhanced signal.

The speech recognition apparatus 200 according to an embodiment of the disclosure may indicate a direction of a determined beam when performing beamforming on the multi-channel audio signal. For example, when the speech recognition apparatus 200 includes the plurality of microphones, the speech recognition apparatus 200 may indicate a direction of beamforming by using at least one light emitting diode (LED) by arranging the LED at a position corresponding to a position where each microphone is disposed. Alternatively, the speech recognition apparatus 200 may indicate a direction of a microphone determined to include a target speech among audio signals received through the plurality of microphones by arranging the plurality of LEDs or a circular LED around the speech recognition apparatus 200.

As an example, when the speech recognition apparatus 200 performs adaptive beamforming, because a user 10 who utters a speech command moves, the speech recognition apparatus 200 may indicate a location (or a direction of the updated beam) where the user 10 moves through the LED. As another example, when the speech recognition apparatus 200 performs fixed beamforming, the speech recognition apparatus 200 may indicate a direction of a fixed beam through an LED.

In addition, the speech recognition apparatus 200 according to an embodiment of the disclosure may activate a speech recognition function by using a WoV function. The speech recognition apparatus 200 according to an embodiment of the disclosure may continuously monitor a signal with respect to a previously determined wake word, thereby activating the entire speech recognition function when the user 10 utters a wake word. When the speech recognition apparatus 200 is woken up, the speech recognition apparatus 200 may perform speech recognition on a command uttered by the user 10 after the wake word, output a speech recognition result, or perform a certain operation corresponding to the speech recognition result.

Figure 2B:
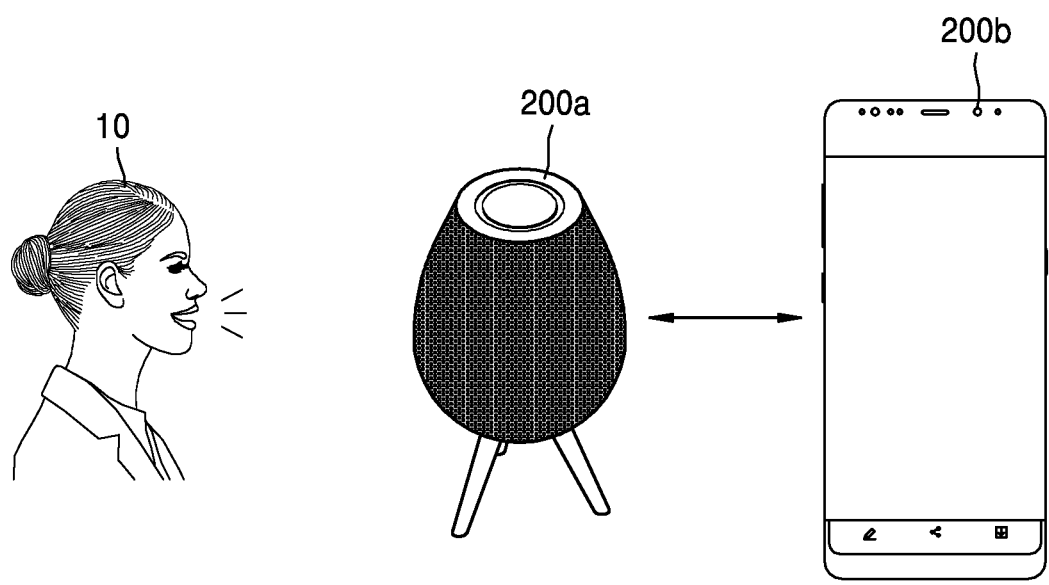
FIG. 2B is a diagram for describing a speech recognition system according to an embodiment of the disclosure.

FIG. 2B is a diagram for describing a speech recognition system according to an embodiment of the disclosure. As shown in FIG. 2B, the speech recognition system according to an embodiment of the disclosure may include a first speech recognition apparatus 200a and a second speech recognition apparatus 200b. The first speech recognition apparatus 200a and the second speech recognition apparatus 200b may be connected by wire or wirelessly connected. The first speech recognition apparatus 200a and the second speech recognition apparatus 200b may be collectively referred to as the speech recognition apparatus 200.

For example, according to an embodiment, the first speech recognition apparatus 200a may be a digital voice assistant device that receives a speech signal and outputs a speech recognition result. However, the embodiment of the disclosure is not limited thereto. The first speech recognition apparatus 200a may be a mobile computing device or a non-mobile computing apparatus such as a wearable device, a smartphone, a tablet PC, a PC, or a smart TV. The second speech recognition apparatus 200b may be a mobile computing device or a non-mobile computing apparatus such as, a smartphone, a tablet PC, a PC, or a smart TV. The first speech recognition apparatus 200a may interoperate with the second speech recognition apparatus 200b.

The first speech recognition apparatus 200a and the second speech recognition apparatus 200b according to an embodiment of the disclosure may transmit and receive control signals or share data.

The first speech recognition apparatus 200a according to an embodiment of the disclosure may receive an audio signal including a speech signal uttered by the user 10 (e.g., via a microphone of the first speech recognition apparatus 200a), and transmit the received audio signal or a compressed signal corresponding to the received audio signal to the second speech recognition apparatus 200b. The second speech recognition apparatus 200b may perform speech recognition based on the signal received from the first speech recognition apparatus 200a. Alternatively, the first speech recognition apparatus 200a may receive the audio signal including the speech signal uttered by the user 10, and transmit the speech signal detected from the received audio signal to the second speech recognition apparatus 200b. Alternatively, the first speech recognition apparatus 200a may receive the audio signal including the speech signal uttered by the user 10, and transmit characteristics of the speech signal detected from the received audio signal to the second speech recognition apparatus 200b.

In addition, the speech recognition apparatus 200 according to an embodiment of the disclosure may perform front-end processing on the received audio signal in order to increase the accuracy of speech recognition. Front-end processing may be performed by the first speech recognition apparatus 200a or may be performed by the second speech recognition apparatus 200b. Alternatively, front-end processing may be partially performed by each of the first speech recognition apparatus 200a and the second speech recognition apparatus 200b.

As an example, according to an embodiment, the first speech recognition apparatus 200a may transmit the received audio signal or the compressed signal to the second speech recognition apparatus 200b, and the second speech recognition apparatus 200b may perform front-end processing on the received signal and perform speech recognition. For example, the first speech recognition apparatus 200a may receive a multi-channel audio signal including the speech signal uttered by the user 10, and transmit the received multi-channel audio signal to the second speech recognition apparatus 200b. The second speech recognition apparatus 200b may perform beamforming on the received multi-channel audio signal to generate the signal with the enhanced target speech signal and perform speech recognition based on the enhanced signal.

As another example, the first speech recognition apparatus 200a may perform front-end processing on the received audio signal and transmit the signal on which front-end processing is performed to the second speech recognition apparatus 200b. According to an embodiment, the second speech recognition apparatus 200b may perform speech recognition on the signal on which front-end processing was performed. For example, according to an embodiment, the first speech recognition apparatus 200a may receive the multi-channel audio signal including the speech signal uttered by the user 10 and perform beamforming on the received multi-channel audio signal, thereby generating the signal with the enhanced target speech signal. According to an embodiment, the first speech recognition apparatus 200a may transmit the enhanced signal to the second speech recognition apparatus 200b, and the second speech recognition apparatus 200b may perform speech recognition based on the received enhanced signal.

In addition, the speech recognition apparatus 200 according to an embodiment of the disclosure may activate a speech recognition function by using a WoV function. The WoV operation may be performed by the first speech recognition apparatus 200a or may be performed by the second speech recognition apparatus 200b. Alternatively, the WoV operation may be partially performed by each of the first speech recognition apparatus 200a and the second speech recognition apparatus 200b.

As an example, according to an embodiment, the second speech recognition apparatus 200b may continuously monitor whether a wake word is included in the received audio signal through the first speech recognition apparatus 200a. According to an embodiment, when the user 10 utters the wake word, the second speech recognition apparatus 200b may activate the entire speech recognition function. According to an embodiment, the second speech recognition apparatus 200b may perform speech recognition on a command uttered by the user 10 after the wake word, and output a speech recognition result through the first speech recognition apparatus 200a or perform a certain operation corresponding to the speech recognition result.

As another example, according to an embodiment, the first speech recognition apparatus 200a may continuously monitor whether the wake word is included in the received audio signal. When the user 10 utters the wake word, the first speech recognition apparatus 200a may notify the second speech recognition apparatus 200b of information that the wake word is uttered, thereby waking up the speech recognition function of the second speech recognition apparatus 200b. The second speech recognition apparatus 200b may perform speech recognition on the command uttered by the user 10 after the wake word, and output a speech recognition result through the first speech recognition apparatus 200a or perform a certain operation corresponding to the speech recognition result.

Figure 2C:
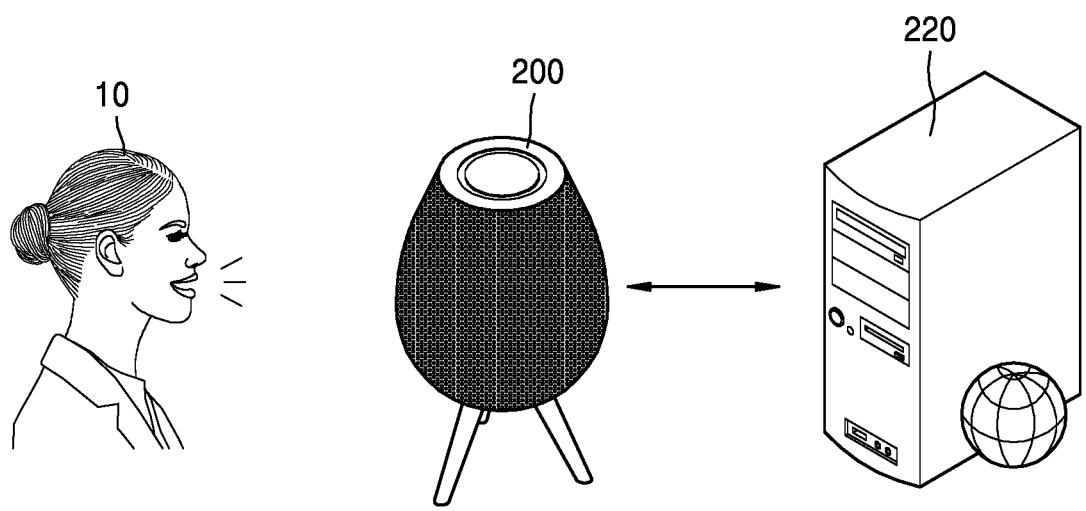
FIG. 2C is a diagram for describing a speech recognition system according to an embodiment of the disclosure.

In addition, FIG. 2C is a diagram for describing a speech recognition system according to an embodiment of the disclosure. As illustrated in FIG. 2C, the speech recognition system according to an embodiment of the disclosure may include the speech recognition apparatus 200 and a speech recognition server 220. The speech recognition apparatus 200 and the speech recognition server 220 may be connected by wire or wirelessly connected. The speech recognition server 220 according to an embodiment of the disclosure may share data with the speech recognition apparatus 200.

For example, according to an embodiment, the speech recognition apparatus 200 may be a digital voice assistant device that receives a speech signal and outputs a speech recognition result. However, the embodiment of the disclosure is not limited thereto. The speech recognition apparatus 200 may be a mobile computing device or a non-mobile computing apparatus such as a wearable device, a smartphone, a tablet PC, a PC, or a smart TV.

The speech recognition apparatus 200, according to an embodiment of the disclosure, may receive an audio signal including a speech signal uttered by the user 10, and transmit the received audio signal or a compressed signal corresponding to the received audio signal to the speech recognition server 220. The second speech server 220 may perform speech recognition based on the signal received from the speech recognition apparatus 200. Alternatively, the speech recognition apparatus 200 may receive the audio signal including the speech signal uttered by the user 10, and transmit the speech signal detected from the received audio signal to the speech recognition server 220. Alternatively, the speech recognition apparatus 200 may receive the audio signal including the speech signal uttered by the user 10, and transmit characteristics of the speech signal detected from the received audio signal to the speech recognition server 220.

In addition, the speech recognition apparatus 200 according to an embodiment of the disclosure may perform front-end processing on the received audio signal in order to increase the accuracy of speech recognition. Front-end processing may be performed by the speech recognition apparatus 200 or may be performed by the speech recognition server 220. Alternatively, front-end processing may be partially performed by each of the speech recognition apparatus 200 and the speech recognition server 220.

As an example, the speech recognition apparatus 200 may transmit the received audio signal or the compressed signal to the speech recognition server 220, and the speech recognition server 220 may perform front-end processing on the received signal and perform speech recognition. For example, the speech recognition apparatus 200 may receive a multi-channel audio signal including the speech signal uttered by the user 10, and transmit the received multi-channel audio signal to the speech recognition server 220. The speech recognition server 220 may perform beamforming on the received multi-channel audio signal to generate the signal with the enhanced target speech signal and perform speech recognition based on the enhanced signal.

As another example, the speech recognition apparatus 200 may perform front-end processing on the received audio signal and transmit the signal on which front-end processing is performed to the speech recognition server 220. The speech recognition server 220 may perform speech recognition on the signal on which front-end processing is performed. For example, the speech recognition apparatus 200 may receive the multi-channel audio signal including the speech signal uttered by the user 10 and perform beamforming on the received multi-channel audio signal, thereby generating the signal with the enhanced target speech signal. The speech recognition apparatus 200 may transmit the enhanced signal to the speech recognition server 220, and the speech recognition server 220 may perform speech recognition based on the received enhanced signal.

In addition, the speech recognition apparatus 200 according to an embodiment of the disclosure may activate a speech recognition function by using a WoV function. The WoV operation may be performed by the speech recognition apparatus 200 or may be performed by the speech recognition server 220. Alternatively, the WoV operation may be partially performed by each of the speech recognition apparatus 200 and the speech recognition server 220.

As an example, the speech recognition server 220 may continuously monitor whether a wake word is included in the received audio signal through the speech recognition apparatus 200. When the user 10 utters the wake word, the speech recognition server 220 may activate a speech recognition function (e.g., the entire speech recognition function). The speech recognition server 220 may perform speech recognition on a command uttered by the user 10 after the wake word, and output a speech recognition result through the speech recognition apparatus 200 or perform a certain operation corresponding to the speech recognition result. According to an embodiment, after the wake word is recognized, the user may be prompted with prompt information indicating that the voice activation function has been initialized/started, and that the speech recognition apparatus 200 is ready to receive a command via voice.

As another example, the speech recognition apparatus 200 may continuously monitor whether the wake word is included in the received audio signal. When the user 10 utters the wake word, the speech recognition apparatus 200 may notify the speech recognition server 220 of information that the wake word is uttered, thereby waking up the speech recognition function of the speech recognition server 220. According to an embodiment, the speech recognition server 220 may perform speech recognition on the command uttered by the user 10 after the wake word, and output a speech recognition result through the speech recognition apparatus 200 or perform a certain operation corresponding to the speech recognition result.

As shown in FIGS. 2A, 2B, and 2C, the speech recognition system according to an embodiment of the disclosure may include at least one speech recognition apparatus, and may further include a device and/or a speech recognition server. Hereinafter, a speech recognition method performed by the "speech recognition apparatus" will be described for convenience of description. However, some or all of operations of the speech recognition apparatus described below may be performed by a device for connecting the speech recognition apparatus and the speech recognition server, and may be partially performed by the plurality of speech recognition apparatuses.

Figure 3A:
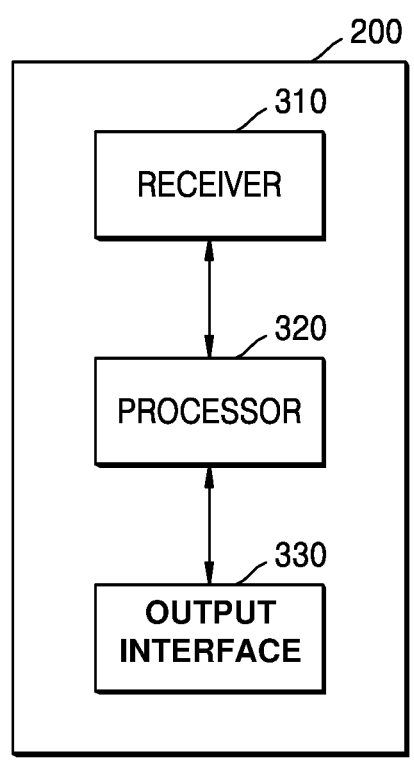
FIG. 3A is a block diagram of a speech recognition apparatus according to an embodiment of the disclosure.
Figure 3B:
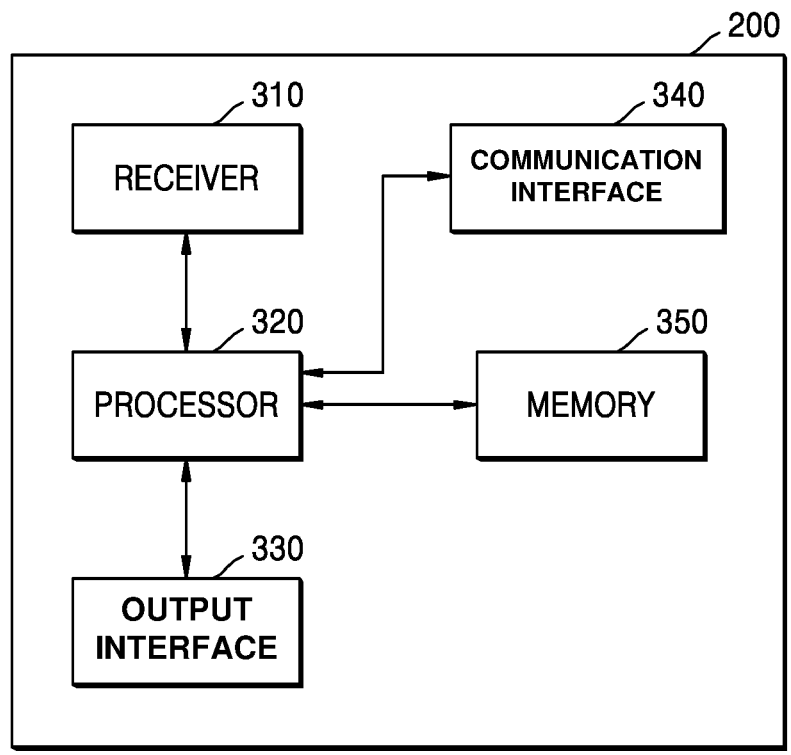
FIG. 3B is a block diagram of a speech recognition apparatus according to an embodiment of the disclosure.

FIG. 3A is a block diagram of a speech recognition apparatus according to an embodiment of the disclosure. As shown in FIG. 3A, the speech recognition apparatus 200 according to an embodiment of the disclosure may include a receiver 310, a processor 320, and an output interface 330. However, the speech recognition apparatus 200 may be implemented by more components than all the components shown in FIG. 3A. FIG. 3B is a block diagram of a speech recognition apparatus according to an embodiment of the disclosure.

For example, as illustrated in FIG. 3B, the speech recognition apparatus 200 according to an embodiment of the disclosure may further include a communication interface 340 and a memory 350.

Also, FIGS. 3A, and 3B illustrate that the speech recognition apparatus 200 includes one processor 320 for convenience, but the embodiment of the disclosure is not limited thereto, and the speech recognition apparatus 301 may include a plurality of processors. When the speech recognition apparatus 200 includes the plurality of processors, operations of the processor 320 described below may be separately performed by the plurality of processors. For example, according to an embodiment, the processor may include a general processor and a graphics processing unit (GPU). The GPU may be dedicated to the learning model. The GPU may have a faster processing speed than the general processor.

According to an embodiment, the receiver 310 may receive an audio signal. For example, the receiver 310 may directly receive the audio signal by converting external sound into electrical acoustic data by using a microphone. The receiver 310 may receive a multi-channel audio signal through a plurality of channels (e.g., a plurality of microphones).

Alternatively, the receiver 310 may receive the audio signal transmitted from an external device. In FIGS. 3A and 3B, according to an embodiment, the receiver 310 may be included in the speech recognition apparatus 200, but the receiver 310 according to another embodiment of the disclosure may be included in a separate apparatus and connected to the speech recognition apparatus 200 by wire or wirelessly connected.

According to an embodiment, the receiver 310 may receive the multi-channel audio signal. According to an embodiment, the multi-channel audio signal may include a plurality of audio signals respectively received from a plurality of channels.

The processor 320 according to an embodiment of the disclosure may perform speech recognition on the audio signal received through the receiver 310. In addition, the processor 320 may perform front-end processing on the received audio signal in order to increase the accuracy of speech recognition. For example, the processor 320 may perform beamforming on a received multi-channel audio signal to generate a signal with an enhanced target speech signal and perform speech recognition based on the enhanced signal. In addition, the processor 320 may activate a speech recognition function by using a WoV function.

Hereinafter, a front-end processing method performed by the processor 320 according to an embodiment of the disclosure will be described in detail.

According to an embodiment, the processor 320 may obtain a speech signal characteristic and a noise signal characteristic for each frequency band from each channel audio signal included in a first multi-channel audio signal.

According to an embodiment, the processor 320 may obtain frequency bin values by performing frequency conversion on each channel audio signal. According to an embodiment, the processor 320 may divide the obtained frequency bin values into values corresponding to speech and values corresponding to noise by applying a mask to the obtained frequency bin values. According to an embodiment, the processor 320 may obtain speech cross power spectral density (cross-PSD) and noise cross-PSD for each frequency band based on the values corresponding to speech and the values corresponding to noise, respectively.

For example, according to an embodiment, when the first multi-channel audio signal includes M audio signals received through M channels, the speech cross-PSD and the noise cross-PSD may be in the form of an M×M matrix.

According to an embodiment, the processor 320 may estimate a mask used to obtain the speech signal characteristic and the noise signal characteristic. According to an embodiment, the processor 320 may convert the first multi-channel audio signal into a single channel audio signal by applying a median value filter to the first multi-channel audio signal, to estimate the mask. According to an embodiment, the processor 320 may estimate a mask value for each frequency band through neural network analysis of the single channel audio signal.

According to an embodiment, the processor 320 may perform beamforming on the first multi-channel audio signal based on the speech signal characteristic, a speech signal characteristic obtained prior to a certain time, and the noise signal characteristic. According to an embodiment, the processor 320 may generate a signal with an enhanced speech component as a result of beamforming. The certain time may be, for example, a predetermined time in consideration of a predetermined length of a wake word and a frame unit.

According to an embodiment, the processor 320 may generate a first enhancement signal by performing first beamforming on the first multi-channel audio signal based on the speech signal characteristic and the noise signal characteristic. According to an embodiment, the processor 320 may generate a second enhancement signal by performing second beamforming on the first multi-channel audio signal based on the speech signal characteristic and a speech signal characteristic obtained prior to an M frame. The second enhancement signal may be a signal in which speech signal characteristic obtained prior to the M frame is removed from a speech signal characteristic obtained with respect to a current frame.

According to an embodiment, the processor 320 may activate a speech recognition operation based on the signal with the enhanced speech component.

According to an embodiment, the processor 320 may activate the speech recognition operation based on the first enhancement signal generated based on the first beamforming and the second enhancement signal generated based on the second beamforming. According to an embodiment, the processor 320 may activate the speech recognition operation based on a determination that a preset word is included in the first enhancement signal or the second enhancement signal.

According to an embodiment, the processor 320 may perform speech recognition on a newly received second multi-channel audio signal. According to an embodiment, the processor 320 may perform speech recognition on the second multi-channel audio signal including a speech signal that is uttered after a user has uttered the preset word (e.g., a wake word). For example, when the first multi-channel audio signal is a signal including the wake word, the second multi-channel audio signal may be a signal including a user command uttered after the wake word.

According to an embodiment, the processor 320 may perform adaptive beamforming on the newly received second multi-channel audio signal when the speech recognition operation is activated based on the determination that the preset word (e.g., wake word) is included in the first enhancement signal. The processor 320 may update parameters with respect to the second multi-channel audio signal received after the first multi-channel audio signal, thereby performing adaptive beamforming based on the updated parameters. For example, the processor 320 may update parameters every frame of the second multi-channel audio signal, thereby performing adaptive beamforming based on the updated parameters. Alternatively, the processor 320 may update beamforming parameters at a certain frame interval, thereby performing adaptive beamforming based on the updated parameters.

Meanwhile, when the speech recognition operation is activated based on a determination that the preset word is not included in the first enhancement signal but the preset word is included in the second enhancement signal, the processor 320 may perform fixed beamforming on the second multi-channel audio signal. The processor 320 may perform fixed beamforming on the second multi-channel audio signal received after the first multi-channel audio signal, based on parameters used in generating the second enhancement signal.

According to an embodiment, the processor 320 according to an embodiment of the disclosure may extract a frequency characteristic of a speech signal from an input audio signal, and perform speech recognition using an acoustic model and a language model. The frequency characteristic may mean a distribution of frequency components of an acoustic input which is extracted by analyzing a frequency spectrum of the acoustic input. Accordingly, as illustrated in FIG. 3B, the speech recognition apparatus 200 may further include a memory 350 that stores the speech model and the language model.

The output interface 330 may output a result of speech recognition performed on the speech signal. The output interface 330 may notify the user of the result of speech recognition or transmit the result to an external device (e.g., a smart phone, a home appliance, a wearable device, an edge device, a server, etc.) For example, the output interface 330 may include a speaker capable of audibly outputting an audio signal or a display capable of displaying a video signal.

Alternatively, the output interface 330 may perform an operation corresponding to the result of speech recognition. For example, the speech recognition apparatus 200 may determine a function of the speech recognition apparatus 200 corresponding to the result of speech recognition and output displayable information (e.g., a graphical user interface performing the function) through the output interface 330. Alternatively, the speech recognition apparatus 200 may transmit a keyword corresponding to the result of speech recognition to an external server (e.g., via the communication interface 340), receive information related to the transmitted keyword from the server (e.g., via the communication interface 340), and output the information on the screen through the output interface 330.

The communication interface 340 of FIG. 3B may communicate with an external device, an apparatus, or server through wired communication or wireless communication. The communication interface 340 may receive an audio signal, a speech signal, a feature of the speech signal, a speech recognition result, information related to a wake word, a parameter for front-end processing, etc. from an external apparatus. Alternatively, the communication interface 340 may transmit the audio signal, the speech signal, the feature of the speech signal, the speech recognition result, the information related to the wake word, the parameter for front-end processing, etc. to the external apparatus. The communication interface 340 according to an embodiment of the disclosure may include a short range communication module, a wired communication module, a mobile communication module, a broadcast receiving module, etc.

According to an embodiment, the memory 350 of FIG. 3B may store an acoustic model for performing speech recognition, a language model, a registration speaker model with respect to a speech signal of a registered speaker for performing speaker recognition, a speech recognition history, the information related to the wake word, and a signal characteristic obtained from a previous frame.

Figure 3C:
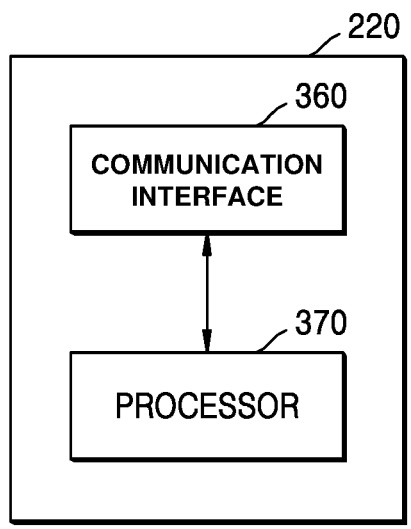
FIG. 3C is a block diagram of a speech recognition server according to an embodiment of the disclosure.

In addition, FIG. 3C is a block diagram of a speech recognition server according to an embodiment of the disclosure. As illustrated in FIG. 3C, the speech recognition apparatus 200 according to an embodiment of the disclosure may include the communication interface 360 and the processor 370. The communication interface 360 and the processor 370 of FIG. 3C may correspond to the communication interface 340 and the processor 320 of FIGS. 3A and 3B, and thus redundant descriptions thereof will be omitted.

According to an embodiment, the speech recognition apparatus 200 according to an embodiment of the disclosure may receive an audio signal or a compressed signal from the speech recognition apparatus 200 through the communication interface 360. Alternatively, the speech recognition server 220 may receive a signal on which front-end processing is performed by the speech recognition apparatus 200 through the communication interface 360. The processor 370 may perform speech recognition on the received signal.

As an example, according to an embodiment, the processor 370 may generate a signal with an enhanced speech component by performing beamforming on the current frame of the first multi-channel audio signal based on the characteristics of the speech signal obtained from the previous frame. Alternatively, the processor 370 may receive the signal with the enhanced speech component from the speech recognition apparatus 200. According to an embodiment, the processor 370 may activate a speech recognition operation based on the signal with the enhanced speech component and perform speech recognition on the newly received second multi-channel audio signal.

As another example, according to an embodiment, the processor 370 may activate the speech recognition operation based on a signal indicating wake-up has been successfully performed being received from the speech recognition apparatus 200 and perform speech recognition on the newly received second multi-channel audio signal.

According to an embodiment, the processor 370 may control the communication interface 360 to transmit the speech recognition result to the speech recognition apparatus 200.

Hereinafter, a detailed operation method of the speech recognition apparatus 200 or the speech recognition server 220 according to an embodiment of the disclosure will be described. Each operation of the method described below may be performed by the respective configurations of the speech recognition apparatus 200 described above and or the speech recognition server 220. For convenience of description, although an example in which the speech recognition apparatus 200 is the main subject of the operation is described, the following description may be applied even when a device for connecting a plurality of speech recognition apparatuses or a speech recognition server is the main subject of the operation.

Figure 4:
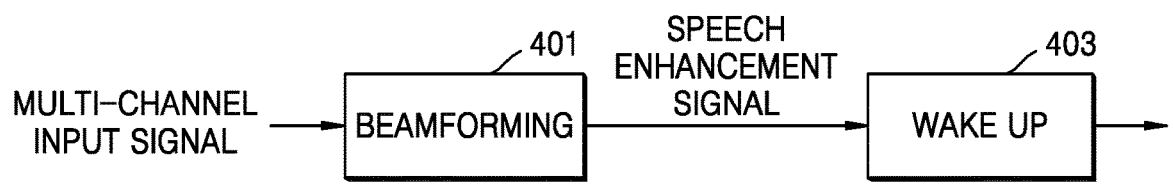
FIG. 4 shows a wake-up method.

FIG. 4 shows a wake-up method.

In using a speech recognition apparatus using WoV technology, a speech signal uttered by a user located at a far distance may seriously deteriorate in the quality due to noise and reverberation while transmitted to the speech recognition apparatus. Therefore, prior to determining whether a wake word is included in an audio signal received by the speech recognition apparatus, front-end processing for removing noise and reverberation included in the audio signal is required.

In particular, multi-channel speech enhancement may be used to increase the wake-up accuracy by the speech of the user located at a distance far from the speech recognition apparatus. For example, beamforming may be used as a multi-channel speech enhancement method. Beamforming means designing a spatiotemporal filter to enhance a target signal.

A front-end processing method may include generating a speech enhancement signal by performing beamforming on a multi-channel audio signal (401) and determining whether to wake up based on the speech enhancement signal (403).

According to the general front-end processing method, a generalized Eigenvalue (GEV) beamformer may be used. According to Equation 1 below, the GEV beamformer may obtain parameters that maximize the signal noise ratio (SNR) for each of time-frequency bin values obtained by frequency converting the multi-channel audio signal. For example, the GEV beamformer may obtain filter coefficients used to constitute a filter for enhancing the target speech signal.

$$F_{GEV}(f,n)=P\{R_n^{-1}(f,n) \cdot R_s(f,n)\}$$

$$R_s(f,n)=\lambda R_n(f,n)w \quad \text{[Equation 1]}$$

In [Equation 1], $P\{A\}$ may represent a first principal component of A. $R_s(f,n)$ may be a speech signal characteristic of each time-frequency bin, and $R_n(f,n)$ may be a noise signal characteristic of each time-frequency bin. For example, $R_s(f,n)$ may be a cross-PSD of a clean speech, and $R_n(f,n)$ may be a cross-PSD of noise. f denotes a frequency index indicating a frequency bin, and n denotes a frame index of the multi-channel audio signal that is a beamforming target. For example, when the multi-channel audio signal is an M-channel input signal, $R_s(f,n)$ and $R_n(f,n)$ may be represented by an M×M matrix.

In a wake-up operation 403 of FIG. 4, the speech recognition apparatus 200 may analyze a signal in which a target speech component is enhanced by beamforming, and determine whether a previously determined wake word is included in the signal. The speech recognition apparatus 200 may wake up a speech recognition function when the previously determined wake word is included in the signal.

However, the front-end processing method illustrated in FIG. 4 is based on the assumption that the spectrum distributions of the target speech signal and the noise signal may be distinguished from each other. Accordingly, when speech noise is included in the noise signal as described above with reference to FIG. 1, the wake-up accuracy may deteriorate.

Specifically describing why the wake-up accuracy may deteriorate in an environment in which speech noise is present, in a front-end processing operation, a spectrum mask for determining whether a speech component is dominant or a noise component is dominant in each time-frequency bin may be estimated. The estimated mask may include a speech mask indicating the proportion of the speech component and a noise mask indicating the proportion of the noise component within each time-frequency bin. In a speech interference environment, a speech mask of a time-frequency bin in which the speech noise is dominant may be largely estimated. Therefore, a signal with deteriorated quality may be output by reinforcing the speech component including the speech noise in a beamforming operation.

To solve this problem, the disclosure proposes a new front-end processing method for speech-interference robust WoV. For a speech-interference robust operation, the speech recognition apparatus 200 according to an embodiment of the disclosure may further include a speech-interference robust beamformer.

The speech-interference robust beamformer according to an embodiment of the disclosure may operate to remove a speech characteristic of a frame prior to a certain time from a speech characteristic of a current frame. The certain time may change according to the length of a wake word, the utterance characteristic of a user, and a time required for the user to utter the wake word.

For example, based on the characteristic that the wake word is uttered within a very short time (e.g., less than 1 second), the speech-interference robust beamformer may perform beamforming using a difference between a speech input characteristic prior to a certain time (e.g., 1 second) and a current speech input characteristic.

Figure 5:
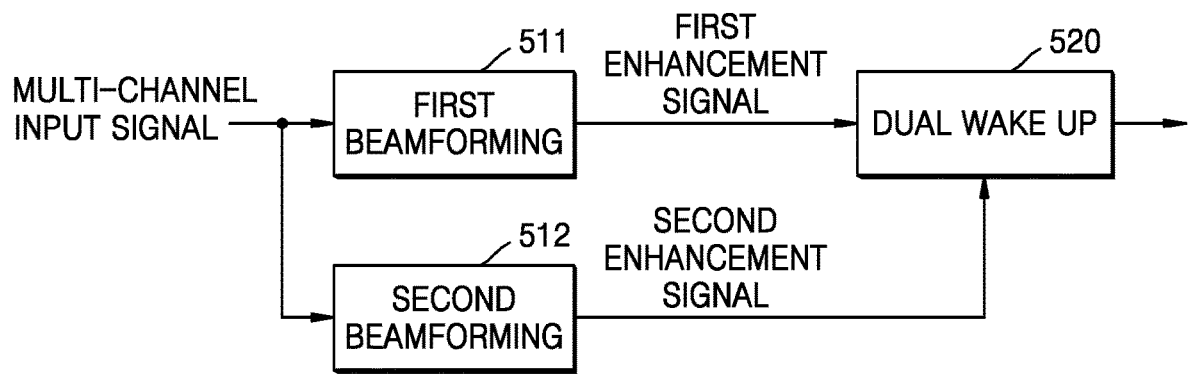
FIG. 5 shows a dual wake-up method according to an embodiment of the disclosure.

As shown in FIG. 5, the speech recognition apparatus 200 according to an embodiment of the disclosure may include a first beamformer 511 that performs a general beamforming method for front-end processing and a second beamformer 512 that performs a newly proposed beamforming method, and a dual wake-up module 420 that determines whether to wake up based on signals in which speech components are enhanced by the first beamformer 511 and the second beamformer 512.

Meanwhile, according to an embodiment of the disclosure, various front-end processing operations may be performed in addition to beamforming shown in FIG. 5. For example, prior to performing beamforming, automatic echo cancellation (AEC), residual echo reduction (Residual Echo Suppression), and the like may be performed. Also, noise suppression may be additionally performed on a single channel signal output by performing beamforming on multi-channel audio signals.

According to an embodiment, the general beamforming method performed by the first beamformer 511 of FIG. 5 may be the same as the method performed by the beamformer 401 of FIG. 4, and thus redundant descriptions are omitted.

As shown in [Equation 2], a modified noise signal characteristic $\tilde{R}_n(f,n)$, may be applied to a newly proposed beamformer $GEV_{prop}$ included in the second beamformer 512.

$$F_{GEV_{prop}}(f,n)=P\{\tilde{R}_n^{-1}(f,n) \cdot R_s(f,n)\}$$

$$\tilde{R}_n(f,n)=\lambda R_s(f,n-M) \quad \text{[Equation 2]}$$

In [Equation 2], $R_s(f, n-M)$ represents a speech signal characteristic prior to the M frame. For example, $R_s(f, n-M)$ may be a speech cross-PSD obtained from a previous frame of the M frame.

The proposed beamformer $GEV_{prop}$ may operate to remove a component corresponding to the speech signal characteristic $\tilde{R}_n(f,n)$ of the frame prior to the M frame from the input of the current frame.

For example, according to an embodiment, when one frame is 16 ms and M is 60, the proposed beamformer $GEV_{prop}$ may operate to remove an estimated attribute of speech prior to 0.96 seconds from the characteristics of a current speech. Therefore, the beamformer $GEV_{prop}$ proposed in the disclosure may remove a speech noise and output a signal with an enhanced target speech even in a speech interference environment, thereby improving the wake-up performance.

However, the beamformer $GEV_{prop}$ proposed in the disclosure is not limited to [Equation 2], and an entire input signal characteristic $R(f,n)$ may be used instead of the speech signal characteristic $R_s(f,n)$.

As shown in FIG. 5, according to the speech-interference robust dual wake-up method according to an embodiment of the disclosure, an output by the general front-end processing method and an output by the speech-interference robust front-end processing method may be simultaneously generated.

According to an embodiment, the first beamformer 511 that performs the general beamforming method and the second beamformer 512 that performs the newly proposed beamforming method may be complementary to each other. Therefore, the speech recognition apparatus according to an embodiment of the disclosure may perform speech enhancement using the first beamformer 511 and the second beamformer 512 in parallel, thereby generating two separately enhanced speech signals. Each of the enhanced speech signals may be supplied to the dual wake-up module 520, and the dual wake-up module 520 may determine whether to wake up based on the enhanced speech signals.

As an example, the dual wake-up module 520 may determine to wake up a speech recognition function when it is determined that a previously determined wake word is included in a first enhancement signal output from the first beamformer 511 or a second enhancement signal output from the second beamformer 512.

As another example, according to an embodiment, the dual wake-up module 520 may determine to wake up the speech recognition function based on at least one of a confidence score that the previously determined wake word is included in the first enhancement signal or a confidence score that the previously determined wake word is included in the second enhancement signal.

Meanwhile, when the speech recognition function is woken up in a speech interference environment based on a front-end processing output signal, the speech recognition apparatus 200 according to an embodiment of the disclosure may perform speech recognition with fixed beamforming in a direction corresponding to the front-end processing output signal.

The speech recognition apparatus 200 according to an embodiment of the disclosure may adaptively perform beamforming while following the position of a moving sound source by performing adaptive beamforming in a general environment. Meanwhile, the speech recognition apparatus 200 may assume that a speaker utters a command that continues at the same position as the position where the speaker utters the wake word in the speech interference environment and perform fixed beamforming, thereby minimizing interference of speech noise and increasing the accuracy of speech recognition.

A specific method of selectively performing adaptive beamforming and fixed beamforming in an automatic speech recognition (ASR) operation after wake-up will be described in more detail with reference to FIG. 9 below.

Hereinafter, a specific operation of a dual beamformer according to an embodiment of the disclosure illustrated in FIG. 5 will be described with reference to FIG. 6.

The speech recognition apparatus 200 according to an embodiment of the disclosure may perform windowing and frequency conversion on a multi-channel audio signal (operation 610). For example, the speech recognition apparatus 200 according to an embodiment of the disclosure may perform windowing and short-time Fourier transform (STFT).

Figure 7:
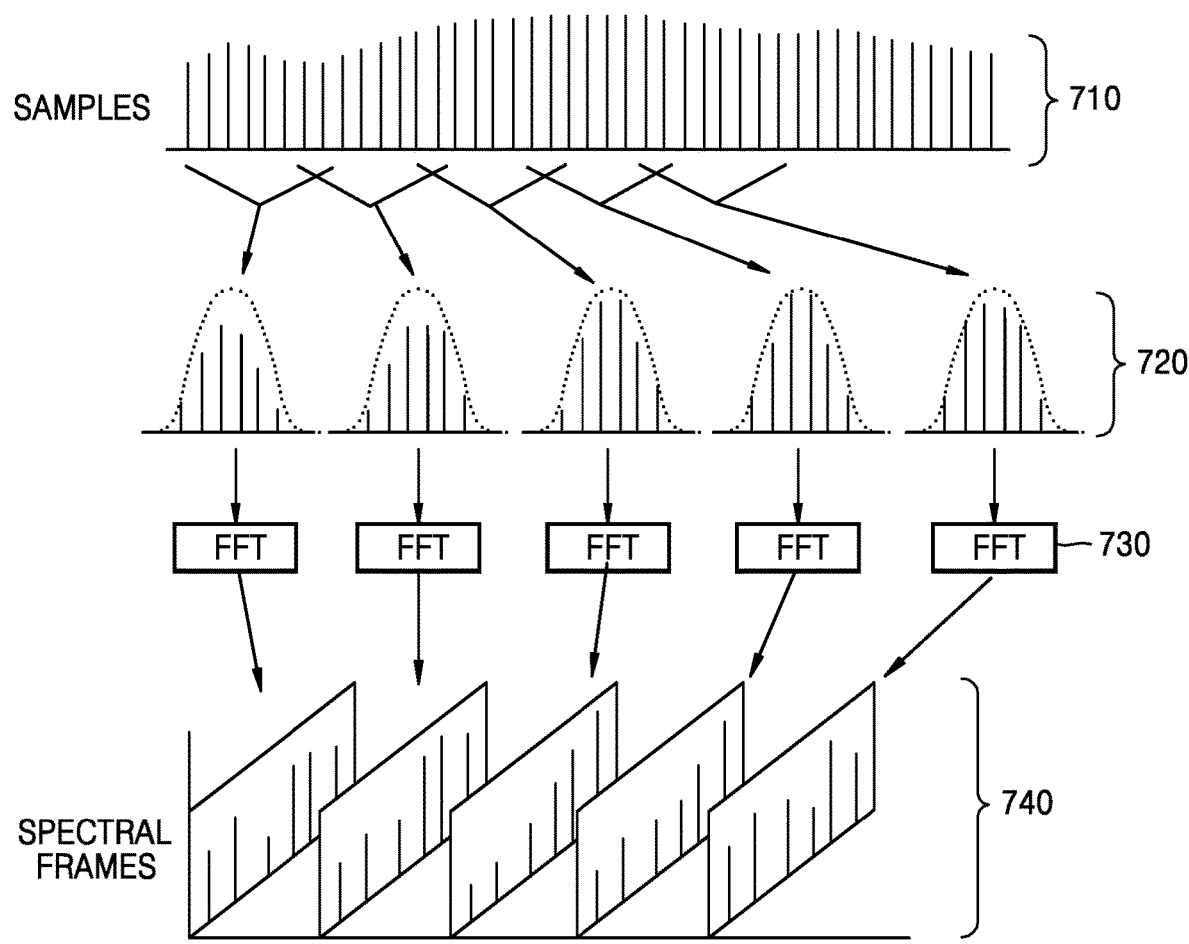
FIG. 7 is a diagram illustrating a short-time Fourier transform (STFT) used according to an embodiment of the disclosure.

As illustrated in FIG. 7, the speech recognition apparatus 200 according to an embodiment of the disclosure may perform windowing on an audio signal 710 obtained by sampling a received audio at certain time intervals, thereby obtaining frames 720 of a predetermined time domain. The speech recognition apparatus 200 may obtain frequency bin values 740 for each frequency band by performing time-frequency conversion 730 on the frames 720.

An example embodiment in which K-order STFT is applied to an M-channel audio signal input through M microphones will be described. After complex fast Fourier transform for each frame is performed on an audio signal of each channel, (K/2+1) order frequency bin values may be obtained from half of the complex fast Fourier transformed signal.

The speech recognition apparatus 200 according to an embodiment of the disclosure may estimate a mask with respect to the obtained frequency bin values 740 (operation 620).

According to an embodiment, the speech recognition apparatus 200 may estimate a spectrum mask indicating the presence of a speech component or a noise component on each frequency bin. The estimated mask may be used to calculate speech signal statistics and noise signal statistics necessary for constituting coefficients of a spatio-temporal filter, i.e., parameters of a beamformer.

The speech recognition apparatus 200 according to an embodiment of the disclosure may estimate two masks. One of the estimated masks may indicate which time-frequency bins are presumably dominated by speech. The other may indicate which time-frequency bins are presumably dominated by noise.

The estimated masks may be used to estimate a noise signal characteristic and a speech signal characteristic of each frequency band.

The speech recognition apparatus 200 may distinguish a part corresponding to clean speech and a part corresponding to noise in an audio signal by applying an estimated mask value to each frequency bin. The speech recognition apparatus 200 may calculate speech cross-PSD and noise cross-PSD, respectively, as the speech signal characteristic and the noise signal characteristic.

When an M-channel audio signal is received, the speech recognition apparatus 200 may indicate the M-channel input characteristic of each time-frequency bin as an M×M cross-PSD. A diagonal value in the M×M cross-PSD may mean the power of each channel audio signal. In the M×M cross-PSD, an off-diagonal value may mean a correlation between two channel audio signals, and a phase value may mean a time-delay between two channel audio signals.

According to an embodiment of the disclosure, to improve the performance of speech recognition based on beamforming, a neural network supported generalized Eigenvector (NN-GEV) beamformer using a neural network may be used. NN-GEV beamforming is a combination of deep learning based time-frequency mask estimation and GEV beamforming. A specific method of estimating a mask using an NN-based classifier will be described in more detail with reference to FIGS. 10 and 11 below.

According to an embodiment, the speech recognition apparatus 200 may newly obtain a noise signal characteristic by updating a noise signal characteristic obtained with respect to the previous frame based on the mask estimated with respect to the current frame (operation 630). The speech recognition apparatus 200 may newly obtain a speech signal characteristic by updating a speech signal characteristic obtained with respect to the previous frame based on the mask estimated with respect to the current frame (operation 640).

According to an embodiment, the speech recognition apparatus 200 may perform beamforming (operation 651) based on the noise signal characteristic and the speech signal characteristic obtained with respect to the current frame.

According to an embodiment, the beamforming (operation 651) may be the same as the method performed by the beamformer 401 of FIG. 4, and thus redundant descriptions are omitted.

According to an embodiment, the speech recognition apparatus 200 may generate an output signal with an enhanced speech component by performing inverse Fourier transform and overlap add on a result of beamforming (operation 661).

Meanwhile, the speech recognition apparatus 200 may perform speech-interference robust beamforming (operation 652) newly proposed in the disclosure, based on the speech signal characteristic obtained from the current frame and the speech signal characteristic 645 obtained prior to the M frame. The beamforming (operation 652) is the same as the method performed by the second beamformer 512 of FIG. 5, and thus redundant descriptions are omitted.

Next, the speech recognition apparatus 200 may generate an output signal with the enhanced speech component by performing inverse fast Fourier transform and overlap ad on the result of beamforming (operation 662).

As described above, according to the front-end processing technology using the beamforming method according to an embodiment of the disclosure, an audio signal including a wake word may be determined from among audio signals received through multi-channels and transmitted to a wake-up module, and thus a speech recognition performance for wake-up may be improved. Accordingly, according to the front-end processing technology using the beamforming method according to an embodiment of the disclosure, the speech recognition performance may be improved even with respect to an utterance of a user located at a distance far away from the speech recognition apparatus 200.

In addition, according to the adaptive noise cancellation (ANC) method based on a single channel (or two channels including one reference channel and one auxiliary channel) according to the related art, there is a disadvantage in that a high performance may not be expected in the ASR because a distorted speech signal is output even in a general environment without a speech interference.

Figure 6:
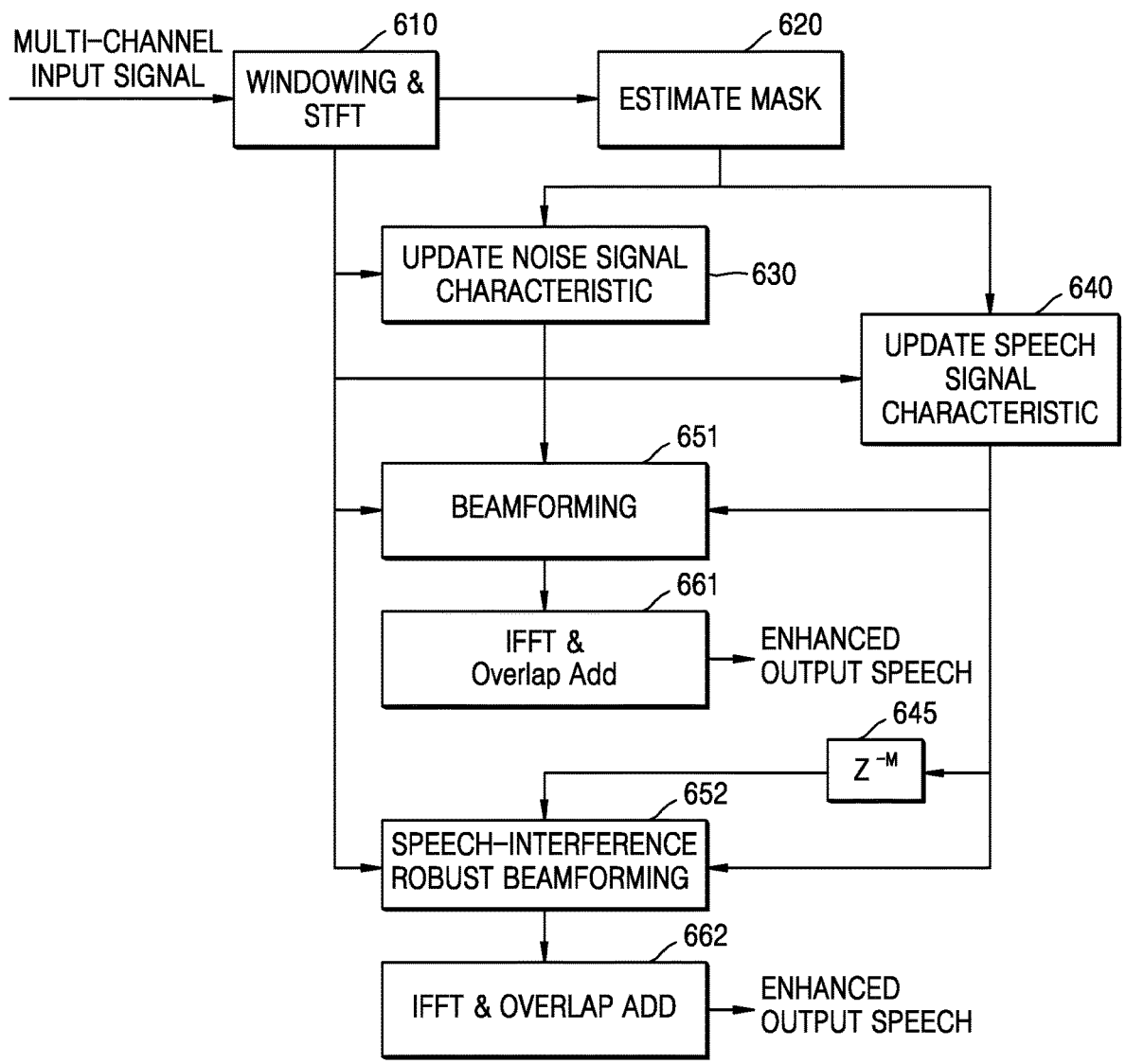
FIG. 6 is a diagram illustrating a dual beamforming method performed in parallel according to an embodiment of the disclosure.

However, according to an embodiment of the disclosure, various post-processing operations may be performed after the beamforming 651 and 652 illustrated in FIG. 6 are performed. For example, distortion may be further reduced by applying an additional post filter to the result of beamforming. The front-end processing method according to an embodiment of the disclosure may perform minimum variance distortionless response (MVDR) beamforming by performing blind analytic normalization (BAN) filtering as an example of post filtering. The front-end processing method according to an embodiment of the disclosure may output a distortionless speech enhancement signal in a general environment as well as in a speech interference environment using an MVDR beamforming method that additionally uses a BAN filter in a GEV beamforming result.

According to an embodiment of the disclosure, a filter coefficient obtained from a previously received frame is not applied to the current frame as it is, but a filter coefficient of the current frame is determined using statistics (e.g., a speech cross-PSD) regarding speech components estimated in the past and statistics of currently estimated speech components, and thus a further distortionless speech enhancement signal may be output.

In addition, the cross-PSD obtained according to an embodiment of the disclosure may be used for various font-end technologies such as noise suppression and sound source localization as well as beamforming.

Hereinafter, with reference to FIG. 8, a whole operation method in which the speech recognition apparatus 200 according to the embodiments of the disclosure described above is woken up and performs speech recognition using a dual beamforming method will be described.

Figure 8:
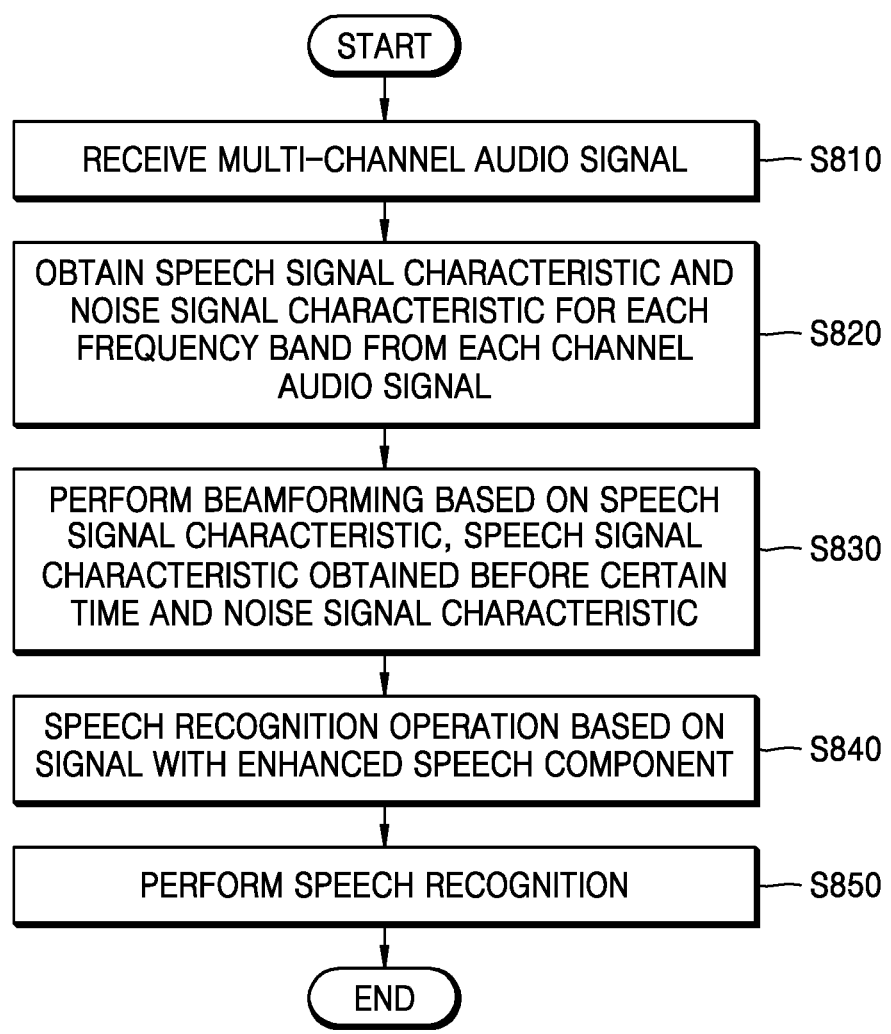
FIG. 8 is a flowchart of a speech recognition method according to an embodiment of the disclosure.

A speech recognition method illustrated in FIG. 8 may include operations processed by the speech recognition apparatus 200 and the speech recognition server 220 illustrated in any one of FIG. 3A, 3B, or 3C. Therefore, even when omitted below, the descriptions provided with respect to the speech recognition apparatus 200 and the speech recognition server 220 may be applied to the speech recognition method of FIG. 8. Redundant descriptions are omitted.

In operation S810, the speech recognition apparatus 200 according to an embodiment of the disclosure may receive a first multi-channel audio signal.

According to an embodiment, the multi-channel audio signal may include audio signals respectively received from a plurality of microphones included in the speech recognition apparatus 200.

In operation S820, the speech recognition apparatus 200 according to an embodiment of the disclosure may obtain a speech signal characteristic and a noise signal characteristic for each frequency band from each channel audio signal included in the first multi-channel audio signal.

According to an embodiment, the speech recognition apparatus 200 may obtain frequency bin values by performing frequency conversion on each channel audio signal. The speech recognition apparatus 200 may divide the obtained frequency bin values into values corresponding to speech and values corresponding to noise by estimating a mask and applying the estimated mask to the obtained frequency bin values. The speech recognition apparatus 200 may obtain speech cross-PSD and noise cross-PSD for each frequency band based on the values corresponding to speech and the values corresponding to noise, respectively.

For example, when the first multi-channel audio signal includes M audio signals received through M channels, the speech recognition apparatus 200 may obtain an M×M speech cross-PSD and an M×M noise cross-PSD with respect to the M channel audio signals for each frequency bin.

According to an embodiment, the speech recognition apparatus 200 may estimate a mask used to obtain the speech signal characteristic and the noise signal characteristic by using a neural network. According to an embodiment, the speech recognition apparatus 200 may convert the first multi-channel audio signal into a single channel audio signal by applying a median value filter to the first multi-channel audio signal and may estimate a mask value for each frequency band through neural network analysis of the single channel audio signal.

In operation S830, the speech recognition apparatus 200 according to an embodiment of the disclosure may perform beamforming on the first multi-channel audio signal based on the speech signal characteristic, a speech signal characteristic obtained prior to a certain time, and the noise signal characteristic, thereby generating a signal with an enhanced speech component.

According to an embodiment, the speech recognition apparatus 200 may generate a first enhancement signal by performing first beamforming on the first multi-channel audio signal based on the speech signal characteristic and the noise signal characteristic with respect to the current frame obtained in operation S820. The first enhancement signal may be a signal in which the noise signal characteristic is removed from the audio signal.

In addition, the speech recognition apparatus 200 may generate a second enhancement signal by performing second beamforming on the first multi-channel audio signal based on the speech signal characteristic with respect to the current frame and a speech signal characteristic obtained with respect to a frame prior to an M frame. According to an embodiment, the second enhancement signal may be a signal in which the speech signal characteristic obtained prior to the M frame is removed from the speech signal characteristic.

In operation S840, the speech recognition apparatus 200 according to an embodiment of the disclosure may activate a speech recognition operation based on the signal with the enhanced speech component.

According to an embodiment, the speech recognition apparatus 200 may activate the speech recognition operation based on a determination that a preset word is included in the first enhancement signal or the second enhancement signal.

In operation S850, the speech recognition apparatus 200 according to an embodiment of the disclosure may perform speech recognition on a newly received second multi-channel audio signal and output a result of speech recognition. The second multi-channel audio signal may include a speech signal uttered after a user has uttered a preset word (e.g., a wake word). For example, when the first multi-channel audio signal is a signal including the wake word, the second multi-channel audio signal may be a signal including a user speech command uttered after the wake word.

According to an embodiment, the speech recognition apparatus 200 according to an embodiment of the disclosure may selectively use adaptive beamforming and fixed beamforming according to a beamforming method used during wake up.

According to an embodiment, the speech recognition apparatus 200 may perform adaptive beamforming on the second multi-channel audio signal when the speech recognition operation is activated based on the determination that the preset word is included in the first enhancement signal in operation S840. The speech recognition apparatus 200 may update parameters with respect to the second multi-channel audio signal, thereby performing adaptive beamforming based on the updated parameters. The speech recognition apparatus 200 may calculate a speech signal characteristic and a noise signal characteristic with respect to at least one frame of the second multi-channel audio signal, and update parameters of a beamformer based on a result of calculation.

For example, the speech recognition apparatus 200 may update parameters every frame of the second multi-channel audio signal, thereby performing adaptive beamforming based on the updated parameters. Alternatively, the speech recognition apparatus 200 may update beamforming parameters at a certain frame interval, thereby performing adaptive beamforming based on the updated parameters.

According to adaptive beamforming, a target signal component and a noise signal component of at least one frame of a newly received multi-channel audio signal may be analyzed, and a filter coefficient for enhancing the target signal may be updated based on an analysis result. Therefore, according to adaptive beamforming, beamforming may be performed using an adaptively changeable beam.

Meanwhile, when the speech recognition operation is activated based on a determination that the preset word is not included in the first enhancement signal but the preset word is included in the second enhancement signal in operation S840, the speech recognition apparatus 200 may perform fixed beamforming on the second multi-channel audio signal. The speech recognition apparatus 200 may perform fixed beamforming on the second multi-channel audio signal, based on parameters used in generating the second enhancement signal. The speech recognition apparatus 200 may perform beamforming on a newly received multi-channel audio signal using the parameters of the beamformer used during wake up.

Figure 9:
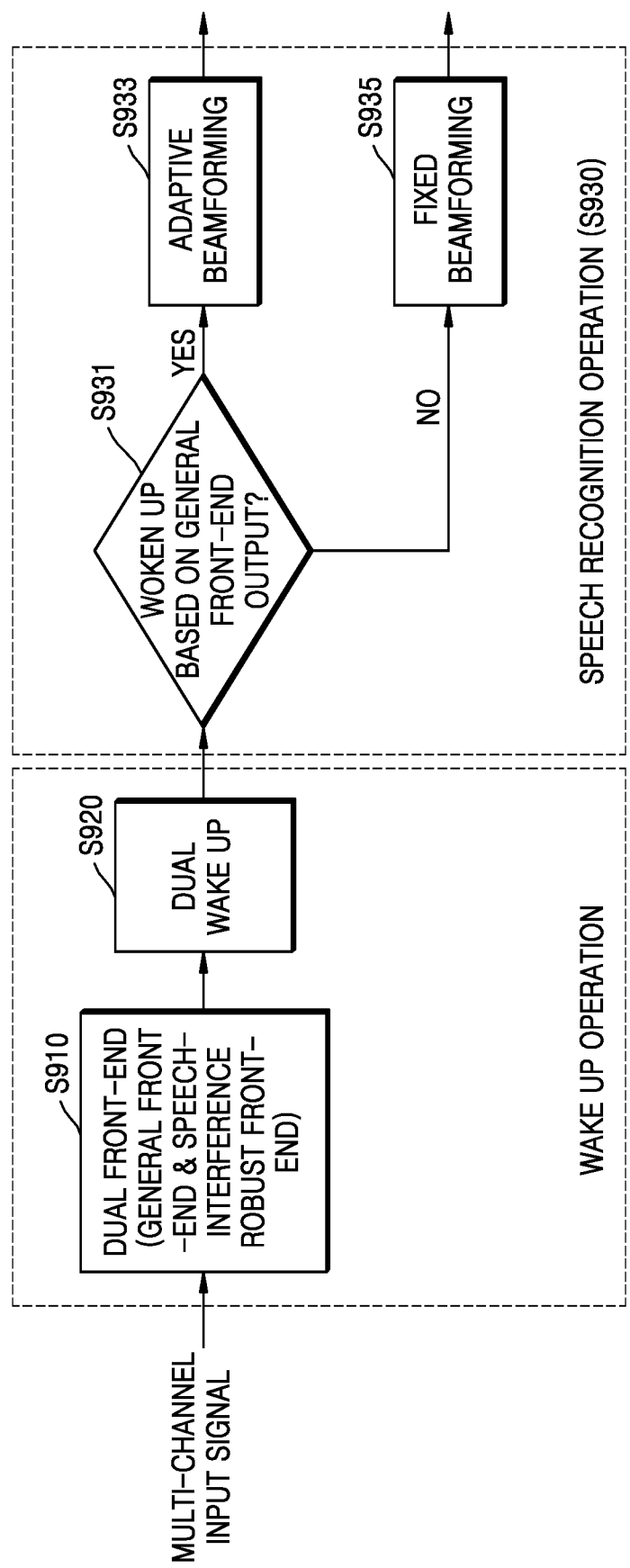
FIG. 9 is a detailed flowchart of a speech recognition method according to an embodiment of the disclosure.

As illustrated in FIG. 9, to maintain a high wake-up success rate in a speech interference environment, the speech recognition apparatus 200 according to an embodiment of the disclosure may perform a dual front-end processing process (S910) and a dual wake-up process (S920) in a wake-up operation.

In operation S910, the speech recognition apparatus 200 may parallel perform general front-end processing and speech-interference robust front-end processing for dual front-end processing. Specifically, the speech recognition apparatus 200 may perform dual beamforming in which general beamforming and newly proposed beamforming to be robust to speech interference are performed in parallel. With regard to dual beamforming performed in parallel, the descriptions of FIGS. 5 and 6 may be applied. Redundant descriptions are omitted.

In operation S920, the speech recognition apparatus 200 may determine whether to wake up based on a signal in which a speech component is enhanced through general beamforming or a signal in which the speech component is enhanced through speech-interference robust beamforming.

Based on determining to wake up a speech recognition function in operation S920, in operation S930, the speech recognition apparatus 200 may perform speech recognition on a main instruction (command) uttered after a wake word and output a speech recognition result.

Based on determining to wake up the speech recognition function in operation S920, in operation S931, the speech recognition apparatus 200 may determine whether a wake word is determined based on the signal enhanced through general beamforming.

According to an embodiment, based on the wake up being determined based on the signal enhanced through the general beamforming (S931=YES), in operation S933, the speech recognition apparatus 200 may perform adaptive beamforming on a newly received multi-channel audio signal. According to an embodiment, the newly received multi-channel audio signal may include the main instruction uttered by a user after the wake word.

Based on the wake up not being determined based on the signal enhanced through general beamforming (S931=NO), the speech recognition apparatus 200 may fix a beam in operation S935. According to an embodiment, in operation S935, the speech recognition apparatus 200 may perform fixed beamforming on the newly received multi-channel audio signal.

In a wake-up operation of recognizing the wake word of a relatively short length (e.g., less than 1 second), the wake-up performance in a speech interference environment may be improved by using speech-interference robust beamforming. However, in an ASR operation of performing speech recognition on the utterance of a relatively long length (e.g., 1 second or more), the speech recognition performance is not guaranteed when using speech-interference robust beamforming.

Therefore, after the speech recognition apparatus 200 wakes up through speech-interference robust beamforming, the speech recognition apparatus 200 may use general beamforming method in preprocessing an audio signal for ASR. The speech recognition apparatus 200 was woken up may mean that speech-interference robust beamforming operated to properly target the utterance of a speaker. Therefore, the speech recognition apparatus 200 may improve speech recognition performance even in the speech interference environment by maintaining the beam upon the wake up.

When the speech recognition apparatus 200 is woken up based on the signal enhanced through speech-interference robust beamforming, beam fixing is required, but when the speech recognition apparatus 200 is woken up based on general beamforming, an adaptive beam may be used.

Meanwhile, the speech recognition apparatus 200 according to an embodiment of the disclosure may use a GEV beamformer using a neural network to improve the beamforming based speech recognition performance.

Figure 10:
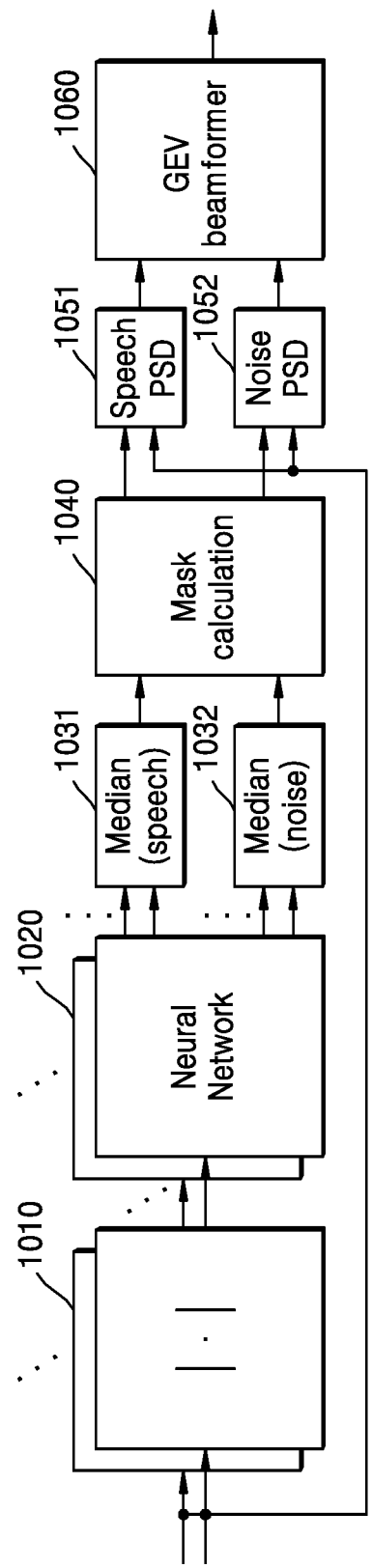
FIG. 10 illustrates a mask calculation method based on a neural network according to an embodiment of the disclosure.

FIG. 10 illustrates a mask calculation method based on a neural network according to an embodiment of the disclosure. As illustrated in FIG. 10, according to an embodiment, the speech recognition apparatus 200 may distinguish a speech component and a noise component through a neural network analysis of an audio signal for each channel with respect to a multi-channel audio signal 1010 (1020). The speech recognition apparatus 200 may apply a median value filter to each of the speech component and the noise component (1031, 1032). The speech recognition apparatus 200 may estimate a mask based on the speech component to which the median value filter is applied and the noise component to which the median value filter is applied (1040). The speech recognition apparatus 200 may obtain a speech cross-PSD (1051), and obtain a noise cross-PSD (1052) based on the estimated mask. The speech recognition apparatus 200 may perform GEV beamforming based on the speech cross-PSD and the noise cross-PSD (1060).

Figure 11:
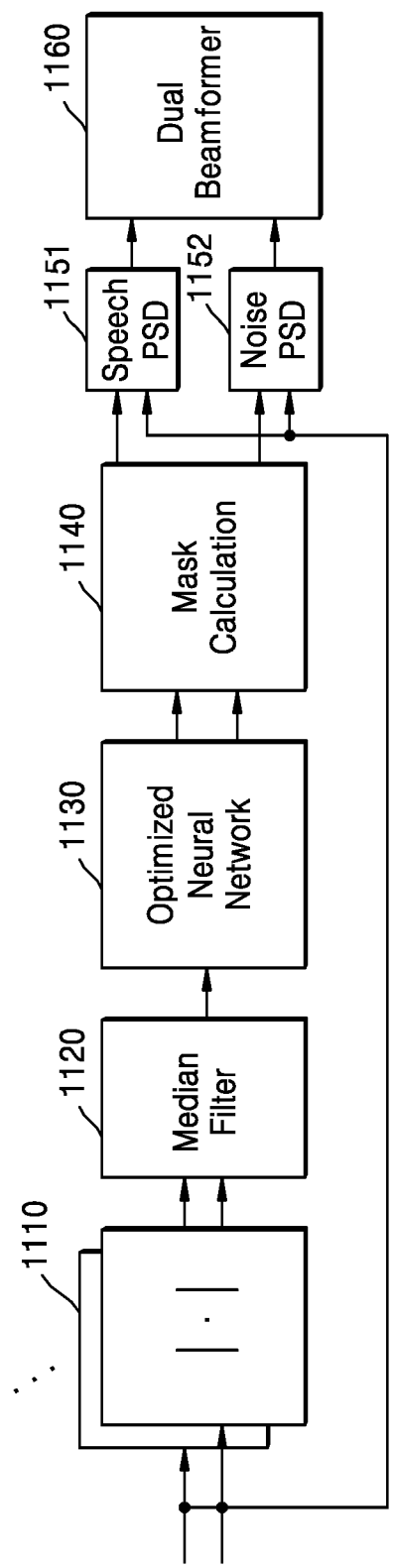
FIG. 11 illustrates a mask calculation method based on a neural network according to another embodiment of the disclosure.

Meanwhile, according to another embodiment of the disclosure, a neural network based mask calculation method illustrated in FIG. 11 may be used. To reduce the computational overload required during front-end processing, a median value filter may be applied before performing neural network analysis on a multi-channel audio signal 1110.

As illustrated in FIG. 11, the speech recognition apparatus 200 may convert the multi-channel audio signal 1110 into a single channel audio signal by applying the median value filter (1120). The speech recognition apparatus 200 may perform optimized neural network analysis on the single channel audio signal (1130). The speech recognition apparatus 200 may estimate a source spectrum through the neural network analysis. The speech recognition apparatus 200 may estimate a mask based on the source spectrum estimated through the neural network analysis (1140). The speech recognition apparatus 200 may obtain a speech cross-PSD (1151) and obtain a noise cross-PSD (1152) based on the estimated mask. The speech recognition apparatus 200 may perform dual beamforming based on the speech cross-PSD and the noise cross-PSD (1060). Dual beamforming may mean performing general beamforming based on a speech signal characteristic and a noise signal characteristic with respect to a current frame and speech-interference robust beamforming based on the speech signal characteristic with respect to the current frame and a speech signal characteristic prior to an M frame in parallel.

As described above with reference to FIGS. 3A to 9, the speech recognition apparatus 200 according to an embodiment of the disclosure may use a general beamformer and a speech-interference robust beamformer in parallel to perform speech enhancement on a multi-channel audio signal. The speech recognition apparatus 200 according to an embodiment of the disclosure may determine whether to wake up based on two speech signals generated by two beamformers.

However, the disclosure is not limited to the above-described embodiment of the disclosure. For example, when it is impossible to operate two beamformers in parallel due to hardware limitations, the general beamformer and the speech-interference robust beamformer may be selectively used.

Figure 12:
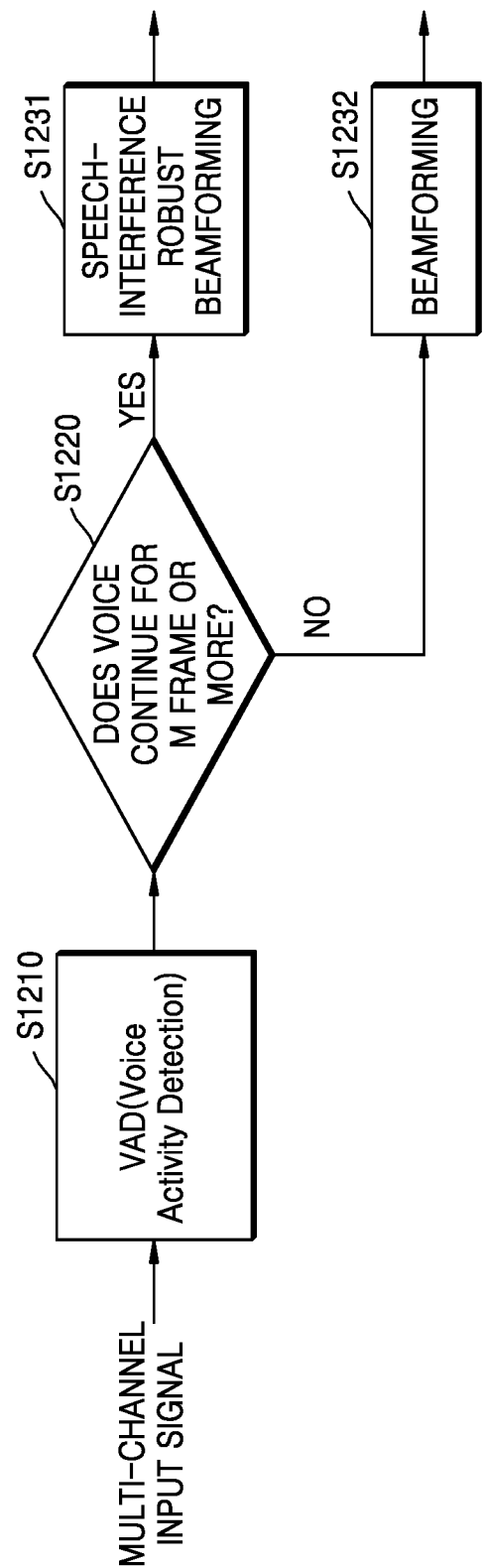
FIG. 12 is a diagram illustrating a dual beamforming method selectively performed according to another embodiment of the disclosure.

As illustrated in FIG. 12, the speech recognition apparatus 200 according to another embodiment of the disclosure may detect a voice operation by a voice activity detection (VAD) module with respect to a multi-channel audio signal (S1210). When a voice noise is included in the multi-channel audio signal, the speech recognition apparatus 200 may determine whether a voice continues for an M frame or more (S1220).

According to an embodiment, the speech recognition apparatus 200 may determine that the speech recognition apparatus 200 is in a speech interference environment when the voice continues for the M frame or more, and perform beamforming by turning on only a speech-interference robust beamformer (S1231). The speech recognition apparatus 200 may determine that the speech recognition apparatus 200 is in a general environment having no speech interference when the voice does not continue for the M frame or more, and perform beamforming by turning on only a general beamformer (S1232).

Therefore, the speech recognition apparatus 200 according to another embodiment of the disclosure shown in FIG. 12 may perform single wake up of determining whether to wake up based on one of a result of performing general beamforming and a result of performing speech-interference robust beamforming, thereby reducing power consumption and computational load.

The embodiments of the disclosure may be implemented in a software program that includes instructions stored on a computer-readable storage medium.

According to an embodiment, the computer may include the image transmission apparatus and the image reception apparatus according to the embodiments of the disclosure, which are apparatuses capable of calling stored instructions from a storage medium and operating according to the embodiments of the disclosure in accordance with the called instructions.

According to an embodiment, the computer-readable storage medium may be provided in the form of a non-transitory storage medium. Here, 'non-transitory' means that the storage medium does not include a signal and is tangible, but does not distinguish whether data is stored semi-permanently or temporarily on the storage medium.

Further, the electronic apparatus or method according to the embodiments of the disclosure may be provided in a computer program product. The computer program product may be traded between a seller and a buyer as a product.

According to an embodiment, the computer program product may include a software program and a computer-readable storage medium having stored therein the software program. For example, the computer program product may include a product (e.g., a downloadable application) in the form of a software program that is electronically distributed through a manufacturer of the electronic apparatus or an electronic marketplace (e.g. Google Play Store and App Store). For electronic distribution, at least a part of the software program may be stored on a storage medium or may be generated temporarily. In this case, the storage medium may be a storage medium of a server of the manufacturer, a server of the electronic market, or a relay temporarily storing the SW program.

According to an embodiment, the computer program product may include a storage medium of a server or a storage medium of a terminal (e.g., the image transmission apparatus or the image reception apparatus) in a system including the server and the terminal. Alternatively, when a third apparatus (e.g., a smart phone) in communication with the server or the terminal is present, the computer program product may include a storage medium of the third apparatus. Alternatively, the computer program product may include a software program itself transmitted from the server to the terminal or the third apparatus, or transmitted from the third apparatus to the terminal.

In this case, one of the server, the terminal and the third apparatus may execute the computer program product to perform the method according to the embodiments of the disclosure. Alternatively, two or more of the server, the terminal and the third apparatus may execute the computer program product to distribute the method according to the embodiments of the disclosure.

For example, the server (e.g., a cloud server or an AI server, etc.) may execute the computer program product stored in the server to control the terminal in communication with the server to perform the method according to the embodiments of the disclosure.

For another example, the third apparatus may execute the computer program product to control the terminal in communication with the third apparatus to perform the method according to the embodiment of the disclosure. For specific example, the third apparatus may remotely control the image transmission apparatus or the image reception apparatus to transmit or receive a packing image.

When the third apparatus executes the computer program product, the third apparatus may download the computer program product from the server and execute the downloaded computer program product. Alternatively, the third apparatus may execute the provided computer program product provided in a preloaded manner to perform the method according to the embodiments of the disclosure.

What is claimed is:

1. A speech recognition method comprising:
    receiving a first multi-channel audio signal;
    obtaining at least one of a speech signal characteristic or a noise signal characteristic for at least one frequency band of frequency bands corresponding to channel audio signals included in the first multi-channel audio signal;
    generating a signal with an enhanced speech component by performing beamforming on the first multi-channel audio signal based on the speech signal characteristic, a speech signal characteristic obtained for a first frame that was obtained within a certain time period prior to a time that a second frame was obtained, and the noise signal characteristic;
    determining whether the enhanced speech component includes a wake word; and
    based on determining that the enhanced speech component includes the wake word:
        determining to wake up; and
        activating a speech recognition operation based on the signal with the enhanced speech component.

2. The speech recognition method according to claim 1, wherein the performing of the beamforming includes removing an estimated noise attribute of speech prior to current speech from the current speech.

3. The speech recognition method of claim 1, further comprising: based on receiving a second multi-channel audio signal after the speech recognition operation has been activated, performing speech recognition on the second multi-channel audio signal.

4. The speech recognition method of claim 3, further comprising: outputting
    a speech recognition result or performing a certain operation corresponding to the speech recognition result.

5. The speech recognition method of claim 1, wherein the generating of the signal with the enhanced speech component comprises:
    generating a first enhancement signal by performing first beamforming on the first multi-channel audio signal based on the speech signal characteristic and the noise signal characteristic; and
    generating a second enhancement signal by performing second beamforming on the first multi-channel audio signal based on the speech signal characteristic and a speech signal characteristic obtained prior to an M frame.

6. The speech recognition method of claim 5, wherein the activating of the speech recognition operation comprises:
    activating the speech recognition operation based on a determination that the wake word is included in the first enhancement signal or the second enhancement signal.

7. The speech recognition method of claim 3, wherein the second multi-channel audio signal comprises a speech signal uttered after a user utters the wake word.

8. The speech recognition method of claim 5, wherein the second enhancement signal is a signal obtained by removing the speech signal characteristic obtained prior to the M frame from the speech signal characteristic.

9. The speech recognition method of claim 1, wherein the obtaining of the speech signal characteristic and the noise signal characteristic comprises:
    obtaining frequency bin values by performing frequency conversion on the each channel audio signal; and
    obtaining speech cross power spectral density (PSD) and noise cross-PSD for each frequency band from each of the obtained frequency bin values by applying a mask.

10. The speech recognition method of claim 9, wherein, when the first multi-channel audio signal comprises M audio signals received through M channels, the speech cross-PSD and the noise cross-PSD are in the form of an M×M matrix.

11. The speech recognition method of claim 1, further comprising estimating a mask used to obtain the speech signal characteristic and the noise signal characteristic,
    wherein the estimating of the mask comprises:
        converting the first multi-channel audio signal into a single-channel audio signal by applying a median value filter to the first multi-channel audio signal; and
        estimating a mask value for each frequency band through a neural network analysis of the single-channel audio signal.

12. The speech recognition method of claim 5, wherein the performing of speech recognition and the outputting of the speech recognition result comprises:
    based on the speech recognition operation being activated based on a determination that the wake word is included in the first enhancement signal, performing adaptive beamforming on the second multi-channel audio signal; and
    based on the speech recognition operation being activated based on a determination that the wake word is not included in the first enhancement signal but the wake word is included in the second enhancement signal, performing fixed beamforming on the second multi-channel audio signal.

13. The speech recognition method of claim 12,
wherein the performing of the adaptive beamforming comprises performing beamforming based on updated parameters by updating parameters every frame of the second multi-channel audio signal, and
wherein the performing of the fixed beamforming comprises performing beamforming on the second multi-channel audio signal based on parameters used in generating the second enhancement signal.

14. The speech recognition method of claim 1, wherein the first multi-channel audio signal and a second multi-channel audio signal are received from a plurality of microphones included in a speech recognition apparatus.

15. A speech recognition apparatus comprising:
a receiver configured to receive a first multi-channel audio signal;
at least one processor configured to:
receive a first multi-channel audio signal;
obtain at least one of a speech signal characteristic or a noise signal characteristic for at least one frequency band of frequency bands corresponding to channel audio signals included in the first multi-channel audio signal;
generate a signal with an enhanced speech component by performing beamforming on the first multi-channel audio signal based on the speech signal characteristic, a speech signal characteristic obtained for a first frame that was obtained within a certain time period prior to a time that a second frame was obtained, and the noise signal characteristic;
determine whether the enhanced speech component includes a wake word; and
based on determining that the enhanced speech component includes the wake word:
determine to wake up; and
activate a speech recognition operation based on the signal with the enhanced speech component.

16. The speech recognition method according to claim 15, wherein the processor is further configured to perform the beamforming by removing an estimated noise attribute of speech prior to current speech from the current speech.

17. The speech recognition apparatus of claim 15, wherein the receiver comprises a plurality of microphones, and
wherein the first multi-channel audio signal and the second multi-channel audio signal are received from the plurality of microphones.

18. A non-transitory computer readable recording medium having stored therein computer program code that, when executed, causes the method of claim 1 to be performed.

* * * * *